(12) United States Patent
Kato

(10) Patent No.: US 8,792,775 B2
(45) Date of Patent: Jul. 29, 2014

(54) INFORMATION PROCESSING DEVICE, INFORMATION PROCESSING METHOD, AND PROGRAM

(75) Inventor: Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 104 days.

(21) Appl. No.: 13/154,829

(22) Filed: Jun. 7, 2011

(65) Prior Publication Data

US 2011/0317980 A1    Dec. 29, 2011

(30) Foreign Application Priority Data

Jun. 23, 2010  (JP) ................................. 2010-142864

(51) Int. Cl.
*G11B 27/00*  (2006.01)
(52) U.S. Cl.
USPC .......................................................... 386/279
(58) Field of Classification Search
None
See application file for complete search history.

(56) References Cited

U.S. PATENT DOCUMENTS

| | | | |
|---|---|---|---|
| 2009/0327710 A1 | 12/2009 | Yoshizawa | |
| 2010/0067873 A1* | 3/2010 | Sasaki et al. | 386/95 |
| 2010/0275238 A1 | 10/2010 | Nagasawa et al. | |
| 2010/0303444 A1* | 12/2010 | Sasaki et al. | 386/248 |

FOREIGN PATENT DOCUMENTS

| | | |
|---|---|---|
| EP | 2 247 117 A2 | 11/2010 |
| JP | 11-195287 | 7/1999 |

OTHER PUBLICATIONS

Extended Search Report issued Aug. 2, 2011 in Europe Application No. 11168454.4.

* cited by examiner

*Primary Examiner* — William C Vaughn, Jr.
*Assistant Examiner* — Daniel Tekle
(74) *Attorney, Agent, or Firm* — Oblon, Spivak, McClelland, Maier & Neustadt, L.L.P.

(57) ABSTRACT

An information processing device includes: a processor determining whether a basic stream that can be reproduced singly and an extended stream used for reproduction with the basic stream forming a video stream of contents to be copied are interleaved with respect to each data in a predetermined unit and recorded in a first recording medium based on control information recorded in the first recording medium; and a recording controller, in the case of a determination that the basic and extended streams are interleaved with respect to each data in the predetermined unit and recorded, designating a first file among the first file that manages the basic stream and allowing copying of the basic stream to a second recording medium, and designating a second file that manages the extended stream and allowing copying of the extended stream to the second recording medium.

20 Claims, 51 Drawing Sheets

FIG.5
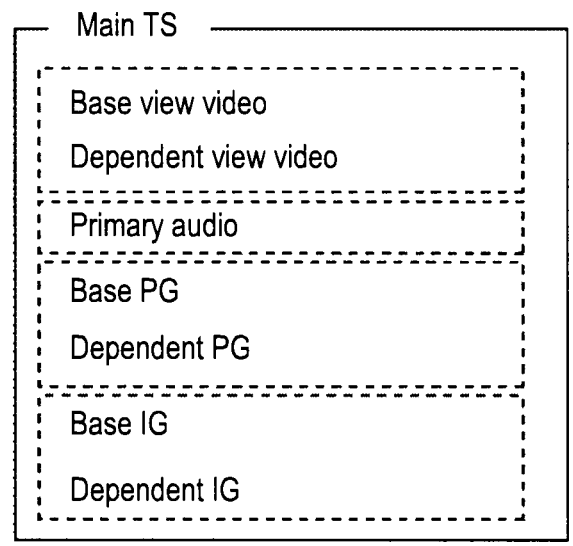
FIG.6
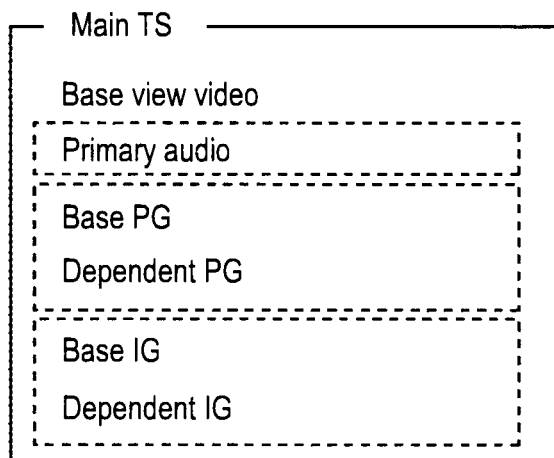
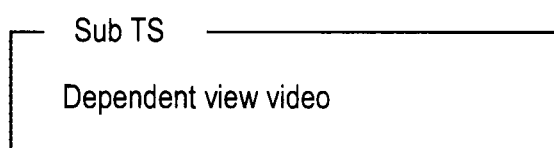

FIG.11

```
1:  yyyyy.mpls {
2:      AppInfoPlayList();
3:      PlayList();
4:      PlayListMark();
5:      ExtensionData();
6:  }

7:  AppInfoPlayList() {
8:      ...
9:      MVC_flag;
10:     ...
11: }

12: PlayList() {
13:     number_of_PlayItems;
14:     number_of_SubPaths;
15:     for (PlayItem_id=0;
16:         PlayItem_id<number_of_PlayItems;
17:         PlayItem_id++) {
18:       PlayItem();
19:     }
20:     for (SubPath_id=0;
21:         SubPath_id<number_of_SubPaths;
22:         SubPath_id++) {
23:       SubPath();
24:     }
25: }

26: PlayItem() {
27:     Clip_Information_file_name;
28:     MVC_file_type;
29:     reserved;
30:     IN_time;
31:     OUT_time;
32:     STN_table() [ref_to_L_video_PID;]
33: }

34: SubPath() {
35:     SubPath_type;
36:     number_of_SubPlayItems;
37:     for (i=0; i<number_of_SubPlayItems; i++) {
38:        SubPlayItem();
39:     }
40: }

41: SubPlayItem() {
42:     Clip_Information_file_name;
43:     SubPlayItem_IN_time;
44:     SubPlayItem_OUT_time;
45: }

46: ExtensionData() {
47:     SubPath_entries_extension();
48:     STN_table_extension();
49: }
```

FIG.12

| MVC_flag | Meaning |
|---|---|
| 0 | This PlayList has no information of MVC reproduction |
| 1 | This PlayList has information of MVC reproduction |

FIG.13

| MVC_file_type | Meaning |
|---|---|
| 0 | Both L video and R video are supplied form one TS shown by Clip_Information_file_name |
| 1 | First TS file containing L video and second TS file containing R video shown by Clip_Information_file_name are interleaved on BD-ROM disc |
| 2 | Both or one of first TS file containing L video and second TS file containing R video shown by Clip_Information_file_name is supplied from local storage |
| 3 | Reserved |

FIG.14

| SubPath_type | Meaning |
|---|---|
| 0 | reserved |
| 1 | reserved |
| 2 | Out-of-mux and primary audio presentation path of the Browsable slideshow<br>(The audio presentation path using the SubPath is not synchronized with the main path using PlayItems in the PlayList.) |
| 3 | Out-of-mux and interactive graphics menu<br>(The interactive graphics menu using the SubPath is not synchronized with the main path using PlayItems in the PlayList.) |
| 4 | Out-of-mux and text subtitle presentation path<br>(The text subtitle presentation path using the SubPath is synchronized with the main path using PlayItems in the PlayList.) |
| 5 | Out-of-mux and AV synchronized type of one or more elementary streams path<br>(Primary audio/PG/IG/Secondary audio path.)<br><br>Out-of-mux and AV synchronized type of Picture-in-Picture presentation path which contains one or more elementary stream paths.<br><br>(The elementary streams used by the path are multiplexed in a separate Clip from other Clip used by PlayItem. The path using the SubPath is synchronized with the main path using PlayItems in the PlayList.) |
| 6 | Out-of-mux and AV non-synchronized type of Picture-in-Picture presentation path which contains one or more elementary stream paths.<br><br>(The elementary streams used by the path are multiplexed in a separate Clip from other Clip used by PlayItem. The path using the SubPath is not synchronized with the main path using PlayItems in the PlayList.) |
| 7 | In-mux type and AV synchronized type of Picture-in-Picture presentation path which contains one or more elementary stream paths.<br><br>(The elementary streams used by the path is multiplexed in the same Clip used by PlayItem. The path using the SubPath is synchronized with the main path using PlayItems in the PlayList.) |
| 8-255 | reserved |

FIG.15

SubPath_entries_extension()

| Syntax | No. of bits | Mnemonic |
|---|---|---|
| SubPath_entries_extension() { | | |
|    length | 32 | uimsbf |
|    number_of_SubPath_extensions | 16 | uimsbf |
|    for (SubPath_id=number_of_SubPaths; | | |
|       SubPath_id<number_of_SubPaths | | |
|     +number_of_SubPath_extensions; | | |
|       SubPath_id++) { | | |
|       SubPath_extension() | | |
|    } | | |
| } | | |

FIG.16

SubPath_extension()

| Syntax | No. of bits | Mnemonic |
|---|---|---|
| SubPath_extension() { | | |
|     length | 32 | uimsbf |
|     reserved_for_future_use | 8 | bslbf |
|     SubPath_type_extension | 8 | bslbf |
|     reserved_for_future_use | 24 | bslbf |
|     number_of_SubPlayItems | 8 | uimsbf |
|     for (i=0;i<number_of_SubPlayItems;i++) { | | |
|         SubPlayItem(i) | | |
|     } | | |
| } | | |

FIG.17

| SubPath_type_extension | Meaning |
|---|---|
| 0-7 | N/A |
| 8 | Out-of-mux and R(dependent) video path<br><br>Sub reproduction path of TS containing MVC R (dependent) video, the TS is another file than TS of main reproduction path of PlayItem |
| others | reserved |

FIG.18

STN_table_extension

| Syntax | No. of bits | Mnemonic |
|---|---|---|
| STN_table_extension() { | | |
|   for(PlayItem_id=0;PlayItem_id<number_of_PlayItems; | | uimsbf |
|     PlayItem_id++) { | | |
|     length | 16 | uimsbf |
|     ref_to_R_video_info() { | | |
|       stream_entry() | | |
|       stream_attributes() | | |
|     } | | |
| } | | |

FIG.19 stream_entry()

| Syntax | No. of bits | Mnemonic |
|---|---|---|
| stream_entry() { | | |
|   length | 8 | uimsbf |
|   type | 8 | bslbf |
|   if(type==1) { | | |
|     ref_to_stream_PID_of_mainClip | 16 | uimsbf |
|     reserved_for_future_use | 48 | bslbf |
|   } else if(type==2) { | | |
|     ref_to_SubPath_id | 8 | uimsbf |
|     ref_to_subClip_entry_id | 8 | uimsbf |
|     ref_to_stream_PID_of_subClip | 16 | uimsbf |
|     reserved_for_future_use | 32 | bslbf |
|   } | | |
| } | | |

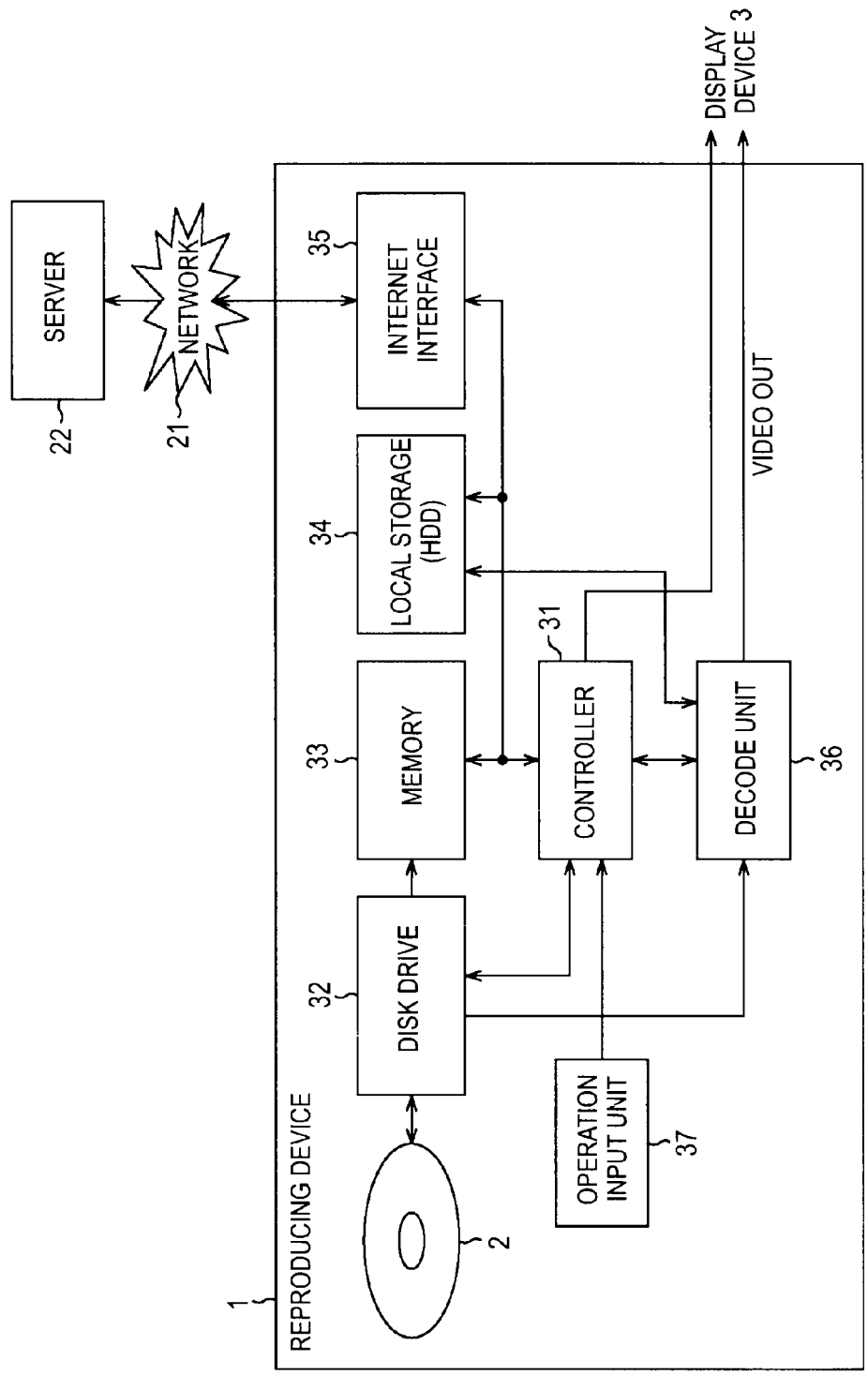

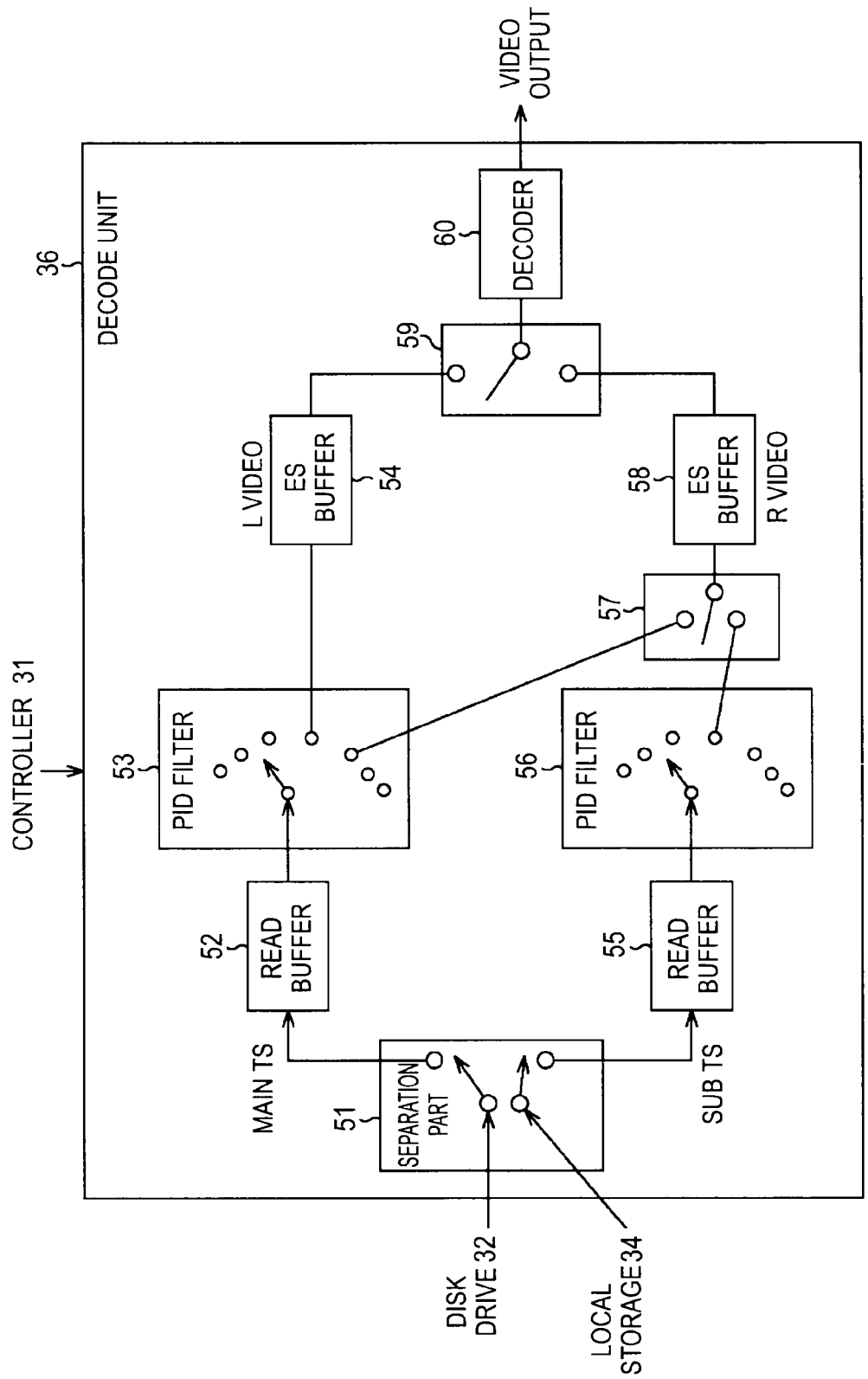

FIG.23

```
00000.mpls{
  AppInfoPlayList() {MVC_flag=1}
  PlayList() {
    PlayItem() {
      "00001" ; // ref to 00001.clpi
      MVC_file_type=1;
      IN_time; OUT_time;
      STN_table() {ref_to_L_video_PID;}
    }
  }
  ExtensionData() {
    SubPath_entries_extension() {
      SubPath_extension() {//SubPath_id = 0 is assigned to the SubPath
        SubPath_type_extension=8;
        SubPlayItem() {
          "00002" ; // ref to 00002.clpi
          SubPlayItem_IN_time; SubPlayItem_OUT_time;
        }
      }
    }
    STN_table_extension() {type=2; ref_to_SubPath_id=0
    ref_to_R_video_PID;}
  }
}
```

FIG.24A

```
00001.clpi {
   number_of_source_packets1
   EP_map
   chunk_map ()
}
```

FIG.24B

```
00002.clpi {
   number_of_source_packets2
   EP_map
   chunk_map ()
}
```

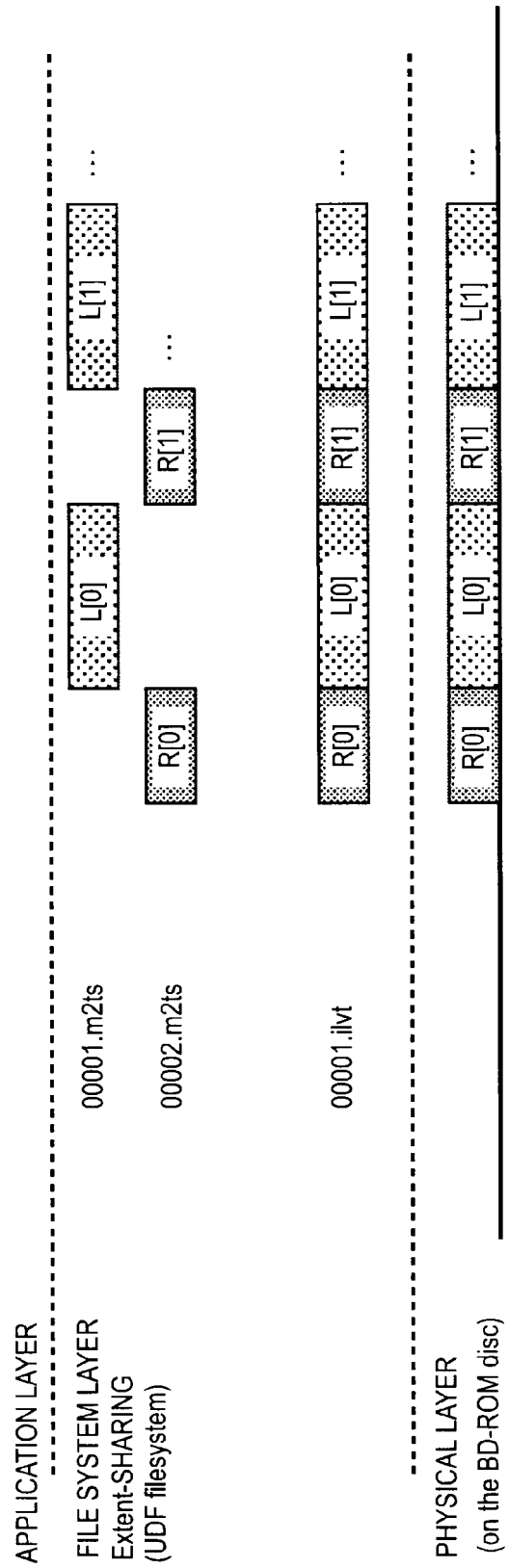

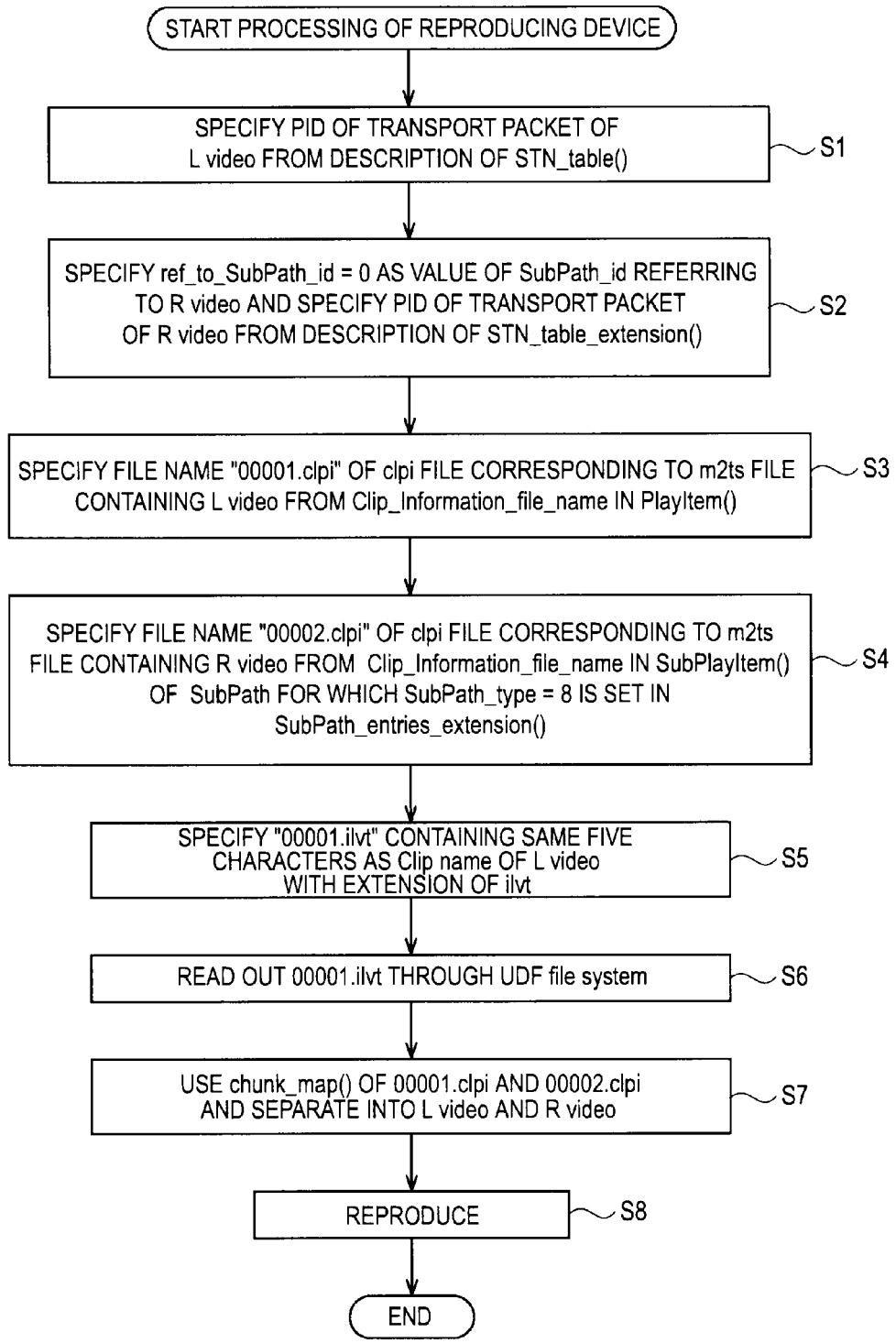

FIG.27

```
chunk_map() {
    number_of_chunks
    for (i=0; i<number_of_chunks; i++) {
        SPN_chunk_start[i]
    }
}
```

FIG.28A

```
00001.clpi {
    number_of_source_packets1
    EP_map
    chunk_map() {
        n+1,
        0, a1, a2, ..., an
    }
}
```

FIG.28B

```
00002.clpi {
    number_of_source_packets2
    EP_map
    chunk_map() {
        n+1,
        0, b1, b2, ..., bn
    }
}
```

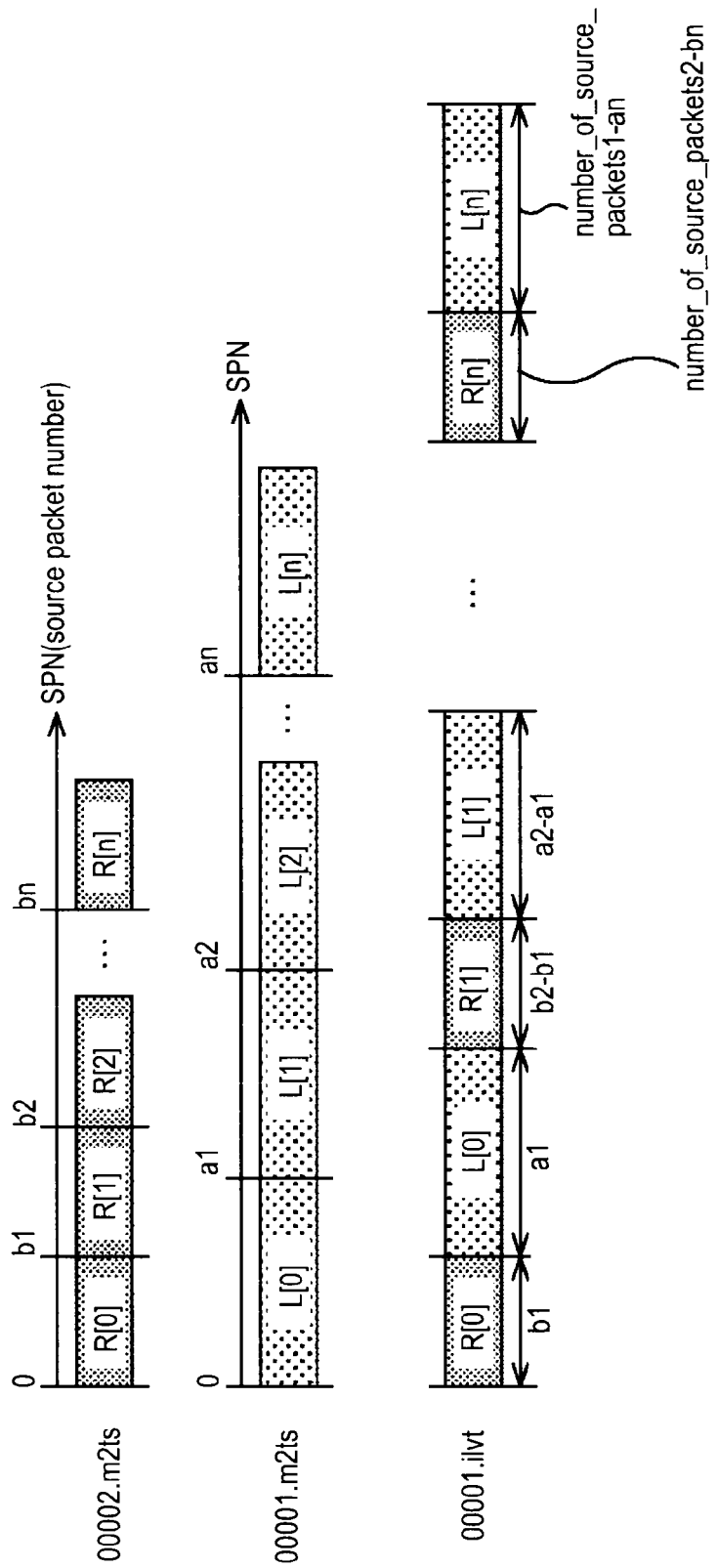

FIG.30

```
EP_map() {
    number_of_EP_entries
    for (i=0; i< number_of_EP_entries; i++) {
        PTS_EP_start[i]
        SPN_EP_start[i]
    }
}
```

FIG.31A

```
00000.mpls{
    AppInfoPlayList() {MVC_flag=1}
    PlayList() {
        PlayItem() {
            "00001" ; // ref to 00001.clpi
            MVC_file_type=0;
            IN_time; OUT_time;
            STN_table() {ref_to_L_video_PID;}
        }
    }
    ExtensionData() {
        STN_table_extension() {type=1; ref_to_R_video_PID;}
    }
}
```

FIG.31B

```
00001.clpi {
    EP_map
}
```

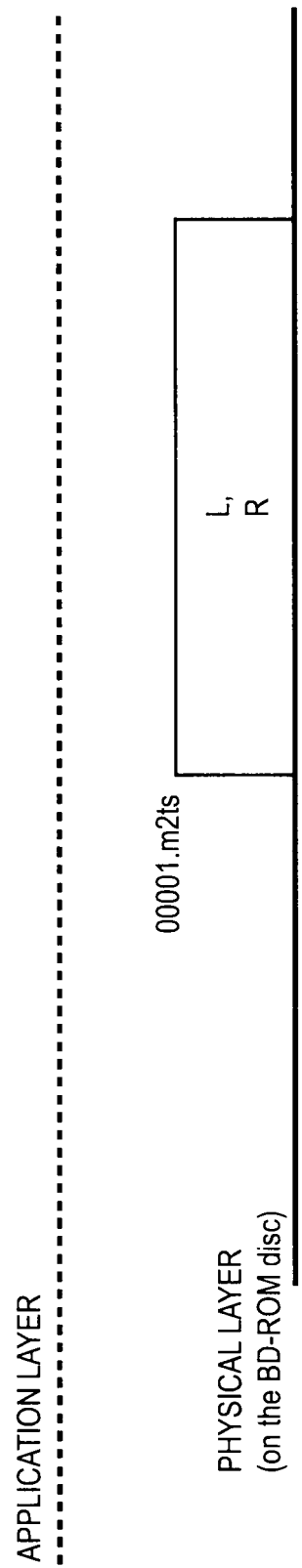

FIG.34

```
00000.mpls {
 AppInfoPlayList() {MVC_flag=1}
 PlayList() {
   PlayItem() {
     "00001" : // ref to 00001.clpi
     MVC_file_type=2;
     IN_time; OUT_time;
         STN_table() {ref_to_L_video_PID;}
   }
 }
 ExtensionData() {
   SubPath_entries_extension() {
     SubPath_extension() {// SubPath_id = 0 is assigned to the SubPath
       SubPath_type_extension=8;
       SubPlayItem() {
         "00003" : // ref to 00003.clpi
         SubPlayItem IN_time; SubPlayItem OUT_time;
       }
     }
   }
   STN_table_extension() {type=2; ref_to_SubPath_id=0
   ref_to_R_video_PID;}
 }
```

FIG.35A

```
00001.clpi {
    EP_map
}
```

FIG.35B

```
00003.clpi {
    EP_map
}
```

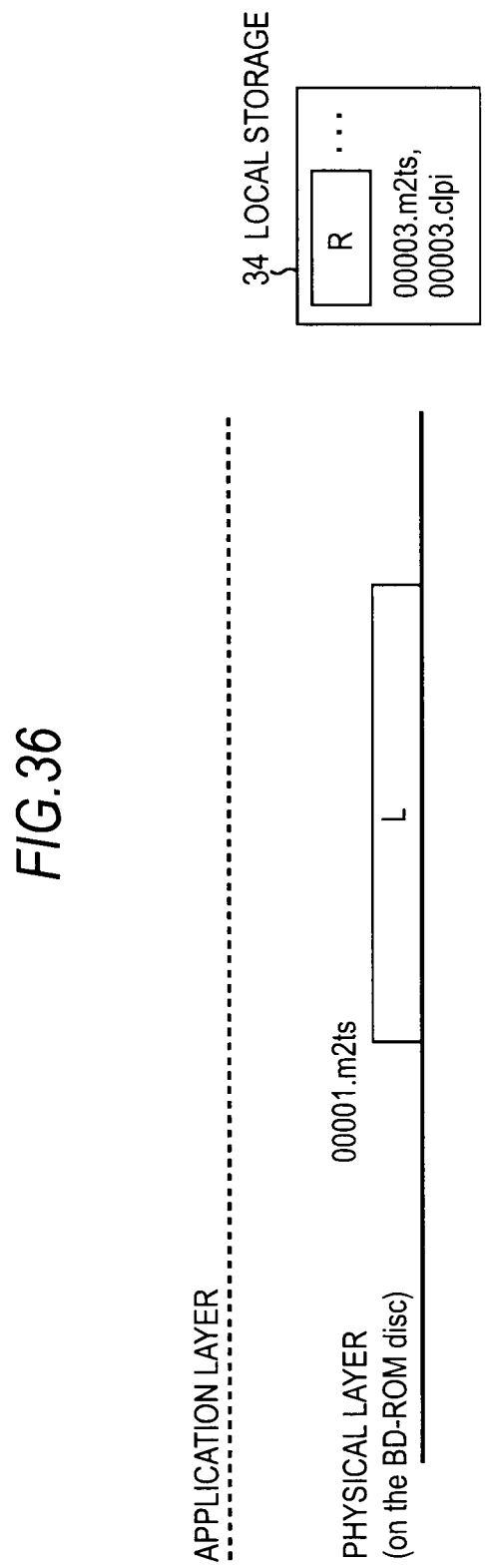

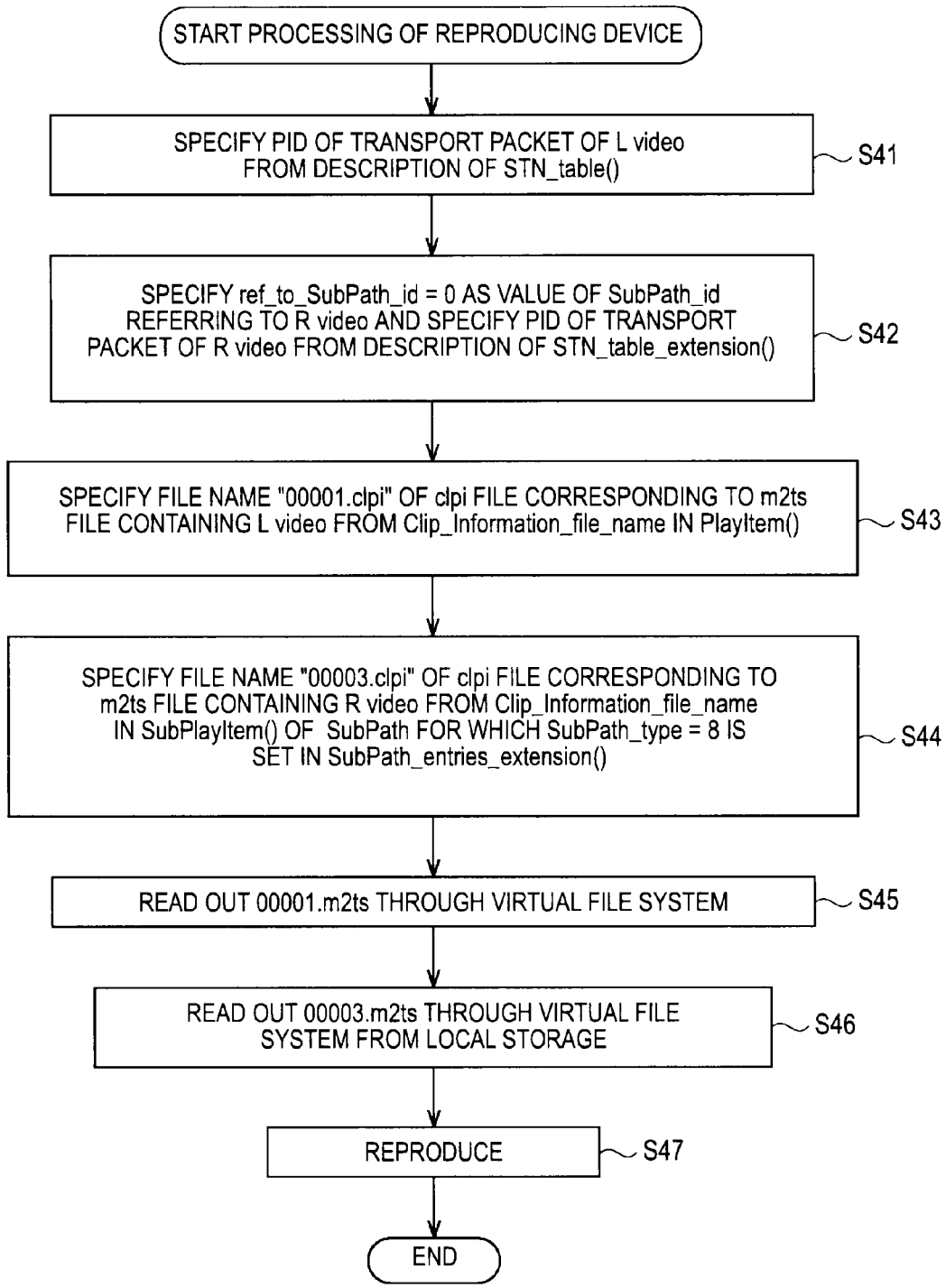

FIG.42

```
PlayList FILE #1

00000.mpls {
  AppInfoPlayList() {MVC_flag=1}
  PlayList() {
    PlayItem() {
      "00001" ; // ref to 00001.clpi
      MVC_file_type=2;
      IN_time; OUT_time;
      STN_table() {ref_to_L_video_PID;}
    }
  }
  ExtensionData() {
    SubPath_entries_extension() {
      SubPath_extension() {
        SubPath_type_extension=8;
        SubPlayItem() {
          "00002" ; // ref to 00002.clpi
          IN_time; OUT_time;
        }
      }
    }
    STN_table_extension() {type=2; ref_to_SubPath_id;
    ref_to_R_video_PID;}
}
```

FIG.43

Clip Information FILE #11

```
00001.clpi {
    number_of_source_packets1
    EP_map
}
```

Clip Information FILE #12

```
00002.clpi {
    number_of_source_packets2
    EP_map
}
```

FIG.47

| SubPath_type_extension | Meaning |
|---|---|
| 0-7 | N/A |
| 8 | Out-of-mux and R (dependent) video path<br><br>Sub reproduction path of TS containing MVC R (dependent) video, the TS is another file than TS of main reproduction path of PlayItem<br><br>Here, two m2ts files are interleaved on BD-ROM disc |
| others | reserved |

FIG.48

| SubPath_type | Meaning |
|---|---|
| 0 | reserved |
| 1 | reserved |
| 2 | Out-of-mux and primary audio presentation path of the Browsable slideshow<br>(The audio presentation path using the SubPath is not synchronized with the main path using PlayItems in the PlayList.) |
| 3 | Out-of-mux and interactive graphics menu<br>(The interactive graphics menu using the SubPath is not synchronized with the main path using PlayItems in the PlayList.) |
| 4 | Out-of-mux and text subtitle presentation path<br>(The text subtitle presentation path using the SubPath is synchronized with the main path using PlayItems in the PlayList.) |
| 5 | Out-of-mux and AV synchronized type of one or more elementary streams path<br>(Primary audio/PG/IG/Secondary audio path.)<br><br>Out-of-mux and AV synchronized type of Picture-in-Picture presentation path which contains one or more elementary stream paths.<br><br>m2ts file of R video stream are supplied from Local storage<br><br>(The elementary streams used by the path are multiplexed in a separate Clip from other Clip used by PlayItem. The path using the SubPath is synchronized with the main path using PlayItems in the PlayList.) |
| 6 | Out-of-mux and AV non-synchronized type of Picture-in-Picture presentation path which contains one or more elementary stream paths.<br><br>(The elementary streams used by the path are multiplexed in a separate Clip from other Clip used by PlayItem. The path using the SubPath is not synchronized with the main path using PlayItems in the PlayList.) |
| 7 | In-mux type and AV synchronized type of Picture-in-Picture presentation path which contains one or more elementary stream paths.<br><br>(The elementary streams used by the path is multiplexed in the same Clip used by PlayItem. The path using the SubPath is synchronized with the main path using PlayItems in the PlayList.) |
| 8-255 | reserved |

FIG.50

PlayList FILE #21

```
00000.mpls{
  PlayList() {
    PlayItem() {
      "00001" : // ref to 00001.clpi
      IN_time; OUT_time;
      STN_table() {ref_to_L_video_PID;}
    }
  }
  ExtensionData() {
    SubPath_entries_extension() {
      SubPath_extension() {
        SubPath_type_extension=5;
        SubPlayItem() {
          "00002" : // ref to 00002.clpi
          IN_time; OUT_time;
        }
      }
    }
    STN_table_extension() {type=2; ref_to_SubPath_id;
    ref_to_R_video_PID;}
  }
}
```

FIG.51

Clip Information FILE #31

```
00001.clpi {
  number_of_source_packets1
  EP_map

}
```

Clip Information FILE #32

```
00002.clpi {
  number_of_source_packets2
  EP_map

PlayList FILE #21

```
00000.mpls{
  PlayList(){
    PlayItem() {
      "00001" : // ref to 00001.clpi
      IN_time; OUT_time;
      STN_table() {ref_to_L_video_PID;}
    }
  }
  SubPath() {
    SubPath_type=5;
    SubPlayItem() {
      "00002" : // ref to 00002.clpi
      IN_time; OUT_time;
    }
  }

ExtensionData() {
    STN_table_extension() {type=2; ref_to_SubPath_id;
    ref_to_R_video_PID;}
  }
}
```

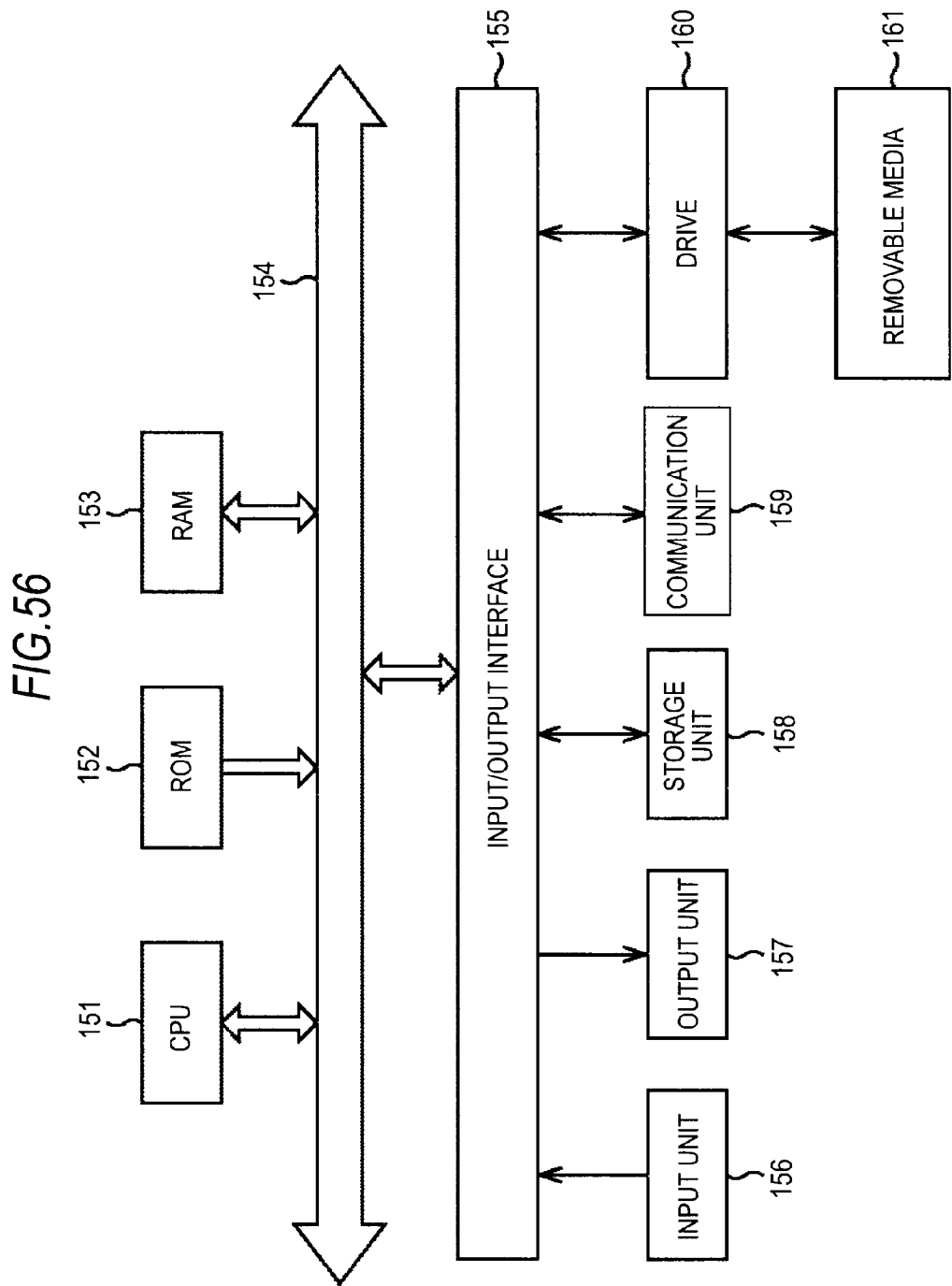

… # INFORMATION PROCESSING DEVICE, INFORMATION PROCESSING METHOD, AND PROGRAM

FIELD

The present disclosure relates to an information processing device, an information processing method, and a program, and specifically to an information processing device, an information processing method, and a program that can efficiently copy plural streams interleaved with respect to each data in a predetermined unit and recorded.

BACKGROUND

Recently, contents of stereoscopically viewable three-dimensional (3D) images have attracted attention. As 3D image display systems, there are various systems such as a frame-sequential system of alternately displaying images for left eye and images for right eye. In the case where any system is employed, the data volume of 3D image contents is larger than the data volume of 2D image contents.

To record high-definition contents of movies etc. as 3D images having large volume, large-capacity recording media are necessary. As the large-capacity recording media, for example, there is a Blu-ray (registered trademark) Disc (hereinafter, referred to BD as appropriate), and recording of 3D image contents in the BD is considered.

SUMMARY

However, in BD standards, how to perform Managed Copy of 3D image contents recorded in BD using a local storage of HDD (Hard Disk Drive) or the like as a copy destination is not specified. Managed Copy is one of functions of AACS as a copyright protection technology employed in BD, and a technology of copying contents recorded in BD while authenticating equipment by communication with a server or the like.

A video stream of 3D image contents includes a video stream for left eye and a video stream for right eye. Depending on management in a file system of the streams, copying may not efficiently be performed by simply designating the file and performing Managed Copy.

Thus, it is desirable to achieve efficient copy of plural streams interleaved and recorded with respect to each data in a predetermined unit in other recording media.

An information processing device according to an embodiment of the present disclosure includes a processor determining whether or not a basic stream that can be reproduced singly and an extended stream used for reproduction with the basic stream forming a video stream of contents to be copied are interleaved with respect to each data in a predetermined unit and recorded in a first recording medium based on control information as information for controlling reproduction of the contents recorded in the first recording medium, and a recording controller, in the case of a determination that the basic stream and the extended stream are interleaved with respect to each data in the predetermined unit and recorded, designating a first file of the first file that manages the basic stream, a second file that manages the extended stream, and a third file that manages the basic stream and the extended stream and allowing copying of the basic stream from the first recording medium to a second recording medium, and designating the second file and allowing copying of the extended stream from the first recording medium to the second recording medium.

The processor may change a value of recording status information representing whether or not the basic stream and the extended stream are interleaved with respect to each data in the predetermined unit and recorded contained in the control information to a value representing that the streams are not interleaved but recorded, and the recording controller may allow recording of the control information containing the recording status information in which the value has been changed in the second recording medium.

The first recording medium may be a Blu-ray Disc, and the control information may be a playlist on Blu-ray standards.

The recording status information may be contained in information on a main path referring to the basic stream forming the playlist.

The recording status information may be a sub path type as information representing a type of a sub path referring to the extended stream contained as information of an extended field in the playlist.

The processor may change the control information so that the information on the sub path contained as the information of the extended field in the playlist may be contained as information of a field for sub path different from the extended field, and the recording controller may allow recording of the control information in which the field containing the information on the sub path has been changed in the second recording medium.

The processor may delete information on respective locations of collections of source packets on the first recording medium as data in the predetermined unit forming the basic stream from first clip information referred to at reproduction of the basic stream and recorded in correspondence with the basic stream in the first recording medium, and delete information on respective locations of collections of source packets on the first recording medium as data in the predetermined unit forming the extended stream from second clip information referred to at reproduction of the extended stream and recorded in correspondence with the extended stream in the first recording medium. Further, the recording controller may allow recording of the first clip information and the second clip information from which the information on the respective locations of the collections of source packets on the first recording medium have been deleted in the second recording medium.

An information processing method according to another embodiment of the present disclosure includes determining whether or not a basic stream that can be reproduced singly and an extended stream used for reproduction with the basic stream forming a video stream of contents to be copied are interleaved with respect to each data in a predetermined unit and recorded in a first recording medium based on control information as information for controlling reproduction of the contents recorded in the first recording medium, and, in the case of a determination that the basic stream and the extended stream are interleaved with respect to each data in the predetermined unit and recorded, designating a first file among the first file that manages the basic stream, a second file that manages the extended stream, and a third file that manages the basic stream and the extended stream and allowing copying of the basic stream from the first recording medium to a second recording medium, and designating the second file and allowing copying of the extended stream from the first recording medium to the second recording medium.

A program according to still another embodiment of the present disclosure allows a computer to execute processing including determining whether or not a basic stream that can be reproduced singly and an extended stream used for reproduction with the basic stream forming a video stream of contents to be copied are interleaved with respect to each data in a predetermined unit and recorded in a first recording medium based on control information as information for controlling reproduction of the contents recorded in the first recording medium, and, in the case of a determination that the basic stream and the extended stream are interleaved with respect to each data in the predetermined unit and recorded, designating a first file among the first file that manages the basic stream, a second file that manages the extended stream, and a third file that manages the basic stream and the extended stream and allowing copying of the basic stream from the first recording medium to a second recording medium, and designating the second file and allowing copying of the extended stream from the first recording medium to the second recording medium.

In the embodiments of the present disclosure, whether or not the basic stream that can be reproduced singly and the extended stream used for reproduction with the basic stream forming the video stream of contents to be copied are interleaved with respect to each data in the predetermined unit and recorded in the first recording medium is determined based on control information as information for controlling reproduction of the contents recorded in the first recording medium. Further, in the case of the determination that the basic stream and the extended stream are interleaved with respect to each data in the predetermined unit and recorded, the first file among the first file that manages the basic stream, the second file that manages the extended stream, and the third file that manages the basic stream and the extended stream is designated and the basic stream is copied from the first recording medium to the second recording medium, and the second file is designated and the extended stream is copied from the first recording medium to the second recording medium.

According to the embodiments of the present disclosure, plural streams interleaved with respect to each data in a predetermined unit and recorded may efficiently be copied in another recording medium.

BRIEF DESCRIPTION OF THE DRAWINGS

FIG. 5 shows a configuration example of TS.

FIG. 6 shows another configuration example of TS.

FIG. 11 shows syntaxes of a PlayList file.

FIG. 12 shows meanings of MVC_flag.

FIG. 13 shows meanings of MVC_file_type.

FIG. 14 shows meanings of SubPath_types.

FIG. 15 shows syntaxes of SubPath_entries_extension( ).

FIG. 16 shows syntaxes of SubPath_extension( ).

FIG. 17 shows meanings of SubPath_type_extension( ).

FIG. 18 shows syntaxes of STN_table_extension( ).

FIG. 19 shows syntaxes of stream_entry( ).

FIG. 21 is a block diagram showing a configuration example of the reproducing device.

FIG. 22 shows a configuration example of a decode unit.

FIG. 23 shows a specific example of a PlayList file.

FIGS. 24A and 24B show syntaxes of clpi files.

FIG. 25 shows a concept of file management.

FIG. 26 is a flowchart for explanation of reproduction processing performed according to the PlayList file in FIG. 23.

FIG. 27 shows a syntax of chunk_map( ).

FIGS. 28A and 28B show specific examples of chunk_map( ).

FIG. 29 shows an example of separation of data.

FIG. 30 shows a syntax of EP_map( ).

FIGS. 31A and 31B show another example of the PlayList file.

FIG. 32 shows a concept of file management.

FIG. 34 shows yet another example of the PlayList file.

FIGS. 35A and 35B show syntaxes of clpi files.

FIG. 36 shows a concept of file management.

FIG. 37 is a flowchart for explanation of reproduction processing performed according to the PlayList file in FIG. 34.

FIG. 42 shows the PlayList file in which the value of MVC_file_type has been changed.

FIG. 43 shows Clip Information files from which chunk_map( ) has been deleted.

FIG. 47 shows meanings of values of SubPath_type_extension( ).

FIG. 48 shows meanings of values of SubPath_type.

FIG. 50 shows the PlayList file in which the value of SubPath_type_extension( ) has been changed.

FIG. 51 shows Clip Information files from which chunk_map( ) has been deleted.

FIG. 54 shows the PlayList file in which the location of the description of SubPath_extension( ) has been changed.

FIG. 56 is a block diagram showing a configuration example of hardware of a computer.

DETAILED DESCRIPTION

Configuration Example of Reproduction System

Figure 1:
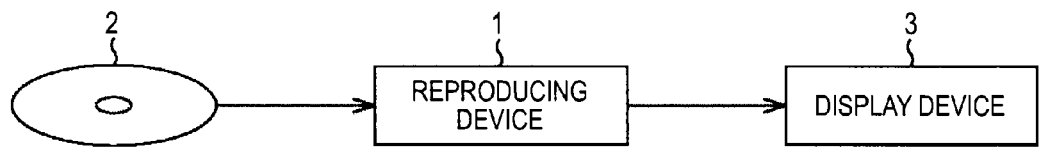
FIG. 1 shows a configuration example of a reproduction system including a reproducing device to which the present disclosure is applied.

FIG. 1 shows a configuration example of a reproduction system including a reproducing device 1 to which the present disclosure is applied.

The reproduction system includes the reproducing device and a display device 3 connected using an HDMI (High Definition Multimedia Interface) cable or the like. In the reproducing device 1, an optical disc 2 as an optical disc on BD standards such as a BD-ROM is mounted.

In the optical disc 2, streams necessary for display of 3D images for two view points are recorded. As an encoding method for recording the streams in the optical disc 2, for example, H.264 AVC (Advanced Video Coding)/MVC (Multi-view Video coding) is employed.

The reproducing device 1 is a player supporting 3D reproduction of the streams recorded in the optical disc 2. The reproducing device 1 reproduces the streams recorded in the optical disc 2 and allows the display device 3 including a television receiver or the like to display 3D images obtained by reproduction. Sound is similarly reproduced by the reproducing device 1 and output from a speaker or the like provided in the display device 3. Note that the reproducing device 1 also supports 2D reproduction like a BD player in related art.

[H.264 AVC/MVC Profile]

In H.264 AVC/MVC, an image stream called Base view video and an image stream called Dependent view video are defined. As below, H.264 AVC/MVC will appropriately and simply be referred to as MVC.

Figure 2:
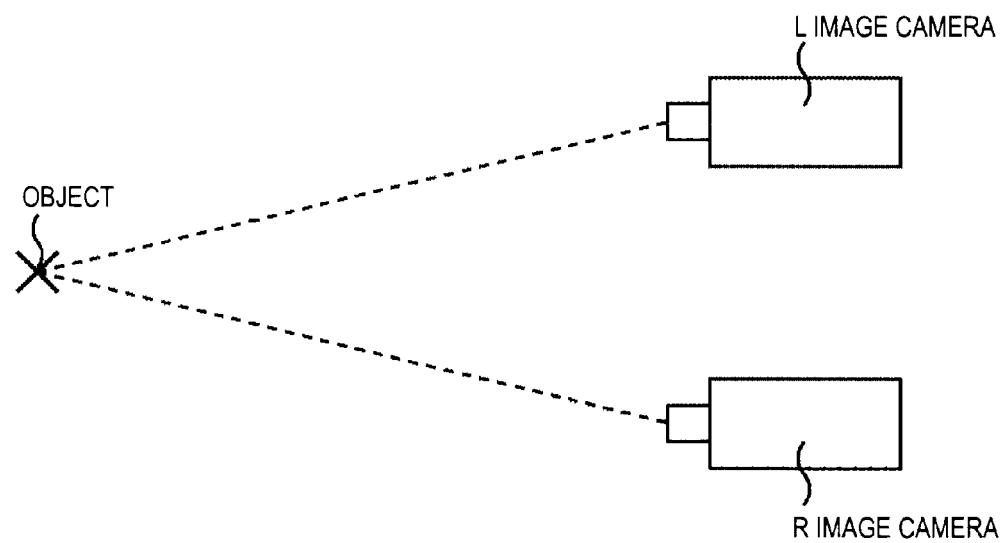
FIG. 2 shows an example of imaging.

FIG. 2 shows an example of imaging.

As shown in FIG. 2, imaging of one object is performed using an L image (left viewpoint) camera and an R image (right viewpoint) camera. Elementary streams of images imaged by the L image camera and the R image camera are input to an MVC encoder.

Figure 3:
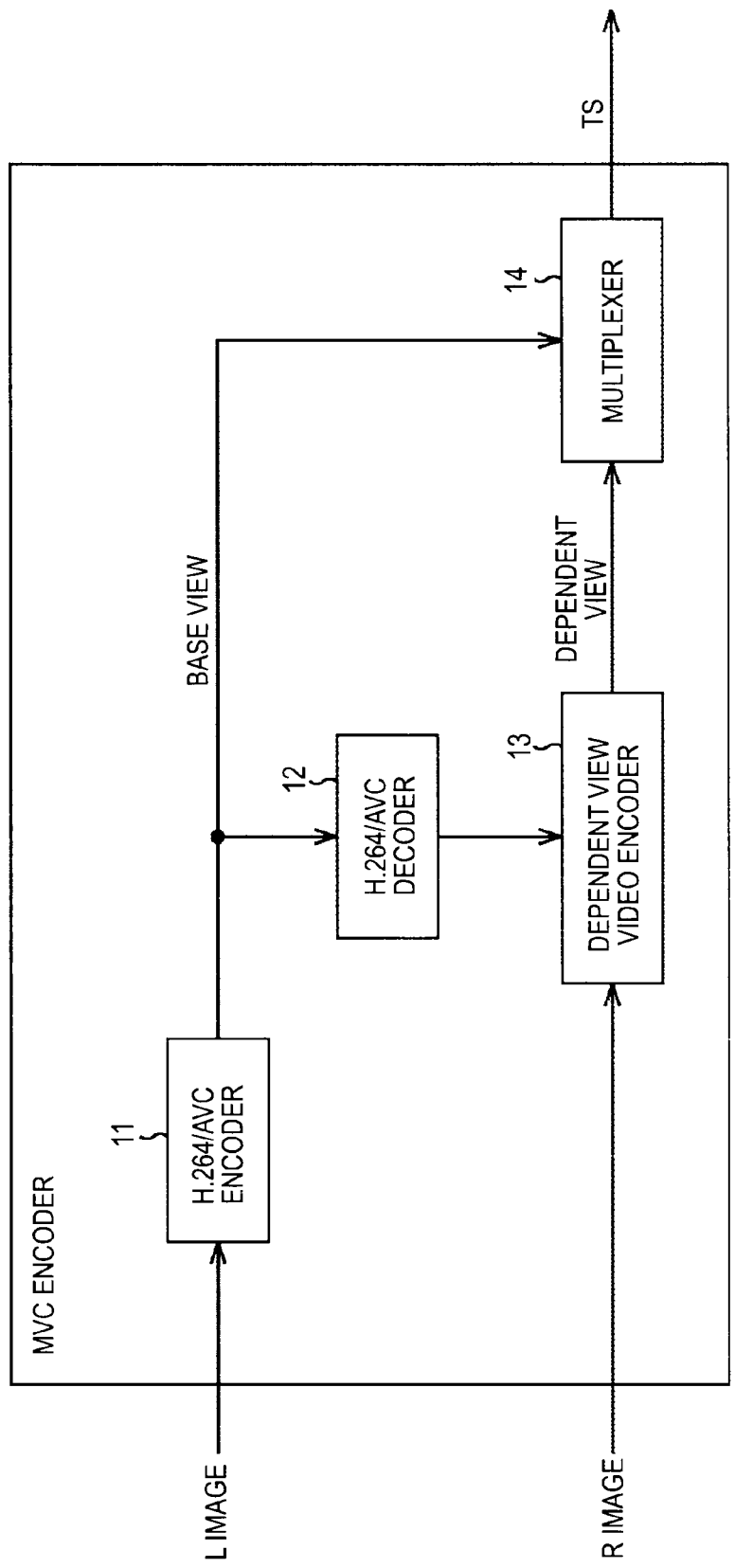
FIG. 3 is a block diagram showing a configuration example of an MVC encoder.

FIG. 3 is a block diagram showing a configuration example of the MVC encoder.

As shown in FIG. 3, the MVC encoder includes an H.264/AVC encoder 11, an H.264/MVC decoder 12, a Dependent view video encoder 13, and a multiplexer 14.

The L image stream imaged by the L image camera is input to the H.264/AVC encoder 11. Further, the R image stream imaged by the R image camera is input to the Dependent view video encoder 13.

The H.264/AVC encoder 11 encodes the L image stream as H.264 AVC/High Profile video stream, for example. The H.264/AVC encoder 11 outputs the AVC video stream obtained by encoding to the H.264/MVC decoder 12 and the multiplexer 14 as a Base video stream.

The H.264/MVC decoder 12 decodes the AVC video stream supplied from the H.264/AVC encoder 11 and outputs the L image stream obtained by decoding to the Dependent view video encoder 13.

The Dependent view video encoder 13 encodes the L image stream supplied from the H.264/MVC decoder 12 and the externally input R image stream and outputs the Dependent view video stream.

Figure 4:
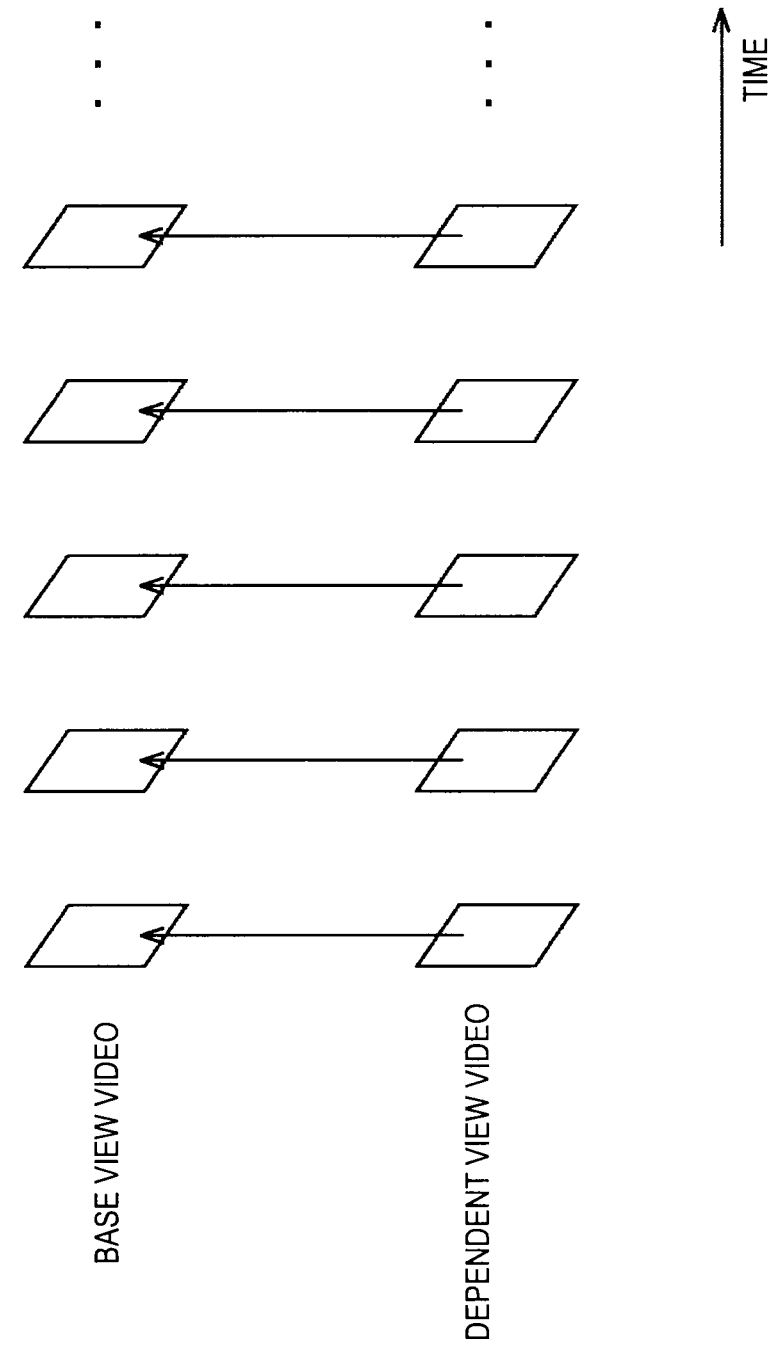
FIG. 4 shows an example of reference to images.

Predictive encoding using other streams as reference images is not allowed for the Base view video, however, as shown in FIG. 4, predictive encoding using the Base view video as reference images is allowed for the Dependent view video. For example, in the case where encoding is performed with the L images as Base view video and R images as Dependent view video, the data volume of the resulting Dependent view video stream becomes smaller compared to the data volume of the Base view video stream.

Note that, because of encoding in H.264/MVC, prediction in the time direction is performed with respect to the Base view video. Further, prediction in the time direction is also performed with respect to the Dependent view video with prediction between views. To decode the Dependent view video, it is necessary to have finished the decoding of the corresponding Base view video that had been referred to at encoding.

The Dependent view video encoder 13 outputs the Dependent view video stream obtained by encoding using prediction between views as well to the multiplexer 14.

The multiplexer 14 multiplexes the Base view video stream supplied from the H.264/AVC encoder 11 and the Dependent view video stream supplied from the Dependent view video encoder 13 as MPEG2 TS, for example. The Base view video stream and the Dependent view video stream may be multiplexed into one MPEG2 TS or contained in separate MPEG2 TS.

The multiplexer 14 outputs the generated TS (MPEG2 TS). The TS output from the multiplexer 14 is recorded in the optical disc 2 with other management data in the recording device, and supplied to the reproducing device 1.

In this example, encoding is performed using the MVC method with the L images as Base view video and R images as Dependent view video, however, oppositely, encoding may be performed with the R images as Base view video and L images as Dependent view video. As below, encoding with the R images as Base view video and L images as Dependent view video will be explained.

When performing 3D reproduction in response to a command by a user or the like, the reproducing device 1 reads out the Base view video stream and the Dependent view video stream from the optical disc 2 and reproduces them.

Further, when performing 2D reproduction, the reproducing device 1 reads out only the Base view video stream from the optical disc 2 and reproduces it. Since the Base view video stream is the AVC video stream encoded in H.264/AVC, any player compliant with the BD format may reproduce the Base view video stream and display 2D images.

Configuration Example of TS

FIG. 5 shows a configuration example of the TS recorded in the optical disc 2.

In Main TS in FIG. 5, the respective streams of Base view video, Dependent view video, Primary audio, Base PG, Dependent PG, Base IG, Dependent IG are multiplexed. Likewise, the Dependent view video stream may be contained in the Main TS as one TS with the Base view video stream.

The Main TS is TS containing at least Base view video stream. On the other hand, Sub TS is TS containing streams other than the Base view video stream and is used with the Main TS at reproduction. In the optical disc 2, the Sub TS is appropriately recorded in addition to the Main TS.

For making 3D display possible like videos, the respective streams of Base view and Dependent view are prepared with respect to PG (Presentation Graphics) such as caption and IG (Interactive Graphics) such as a menu screen.

FIG. 6 shows another configuration example of TS recorded in the optical disc 2.

In Main TS in FIG. 6, the respective streams of Base view video, Primary audio, Base PG, Dependent PG, Base IG, Dependent IG are multiplexed.

On the other hand, a Dependent view video stream is contained in the Sub TS. Likewise, the Dependent view video stream may be contained in another TS than that of the Base view video stream.

As shown in FIG. 6, when the Dependent view video stream and the Base view video stream are contained in separate TS, the respective TS files are interleaved and recorded in the optical disc 2.

Figure 7:
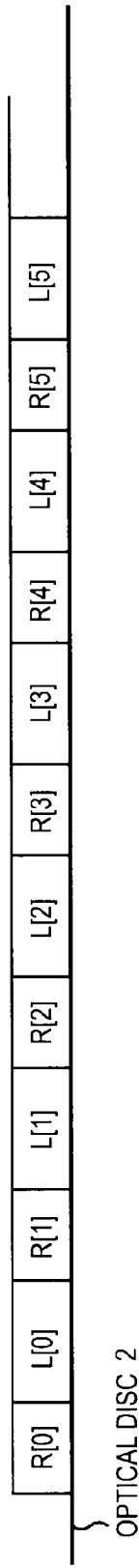
FIG. 7 shows an example of an arrangement of data on an optical disc.

FIG. 7 shows an example of an arrangement of TS files containing Base view video streams (L video streams) and TS files containing Dependent view video streams (R video streams) in the optical disc 2.

As shown in FIG. 7, the TS files containing the L video streams and the TS files containing the R video streams are interleaved to be alternately arranged with respect to each predetermined data unit, and recorded in the optical disc 2. A collection of source packets belonging to one TS file and continuously arranged on the optical disc 2 is referred to as "chunk".

In FIG. 7, the respective blocks shown with characters "R" and numbers represent chunks of R video and the respective blocks shown with characters "L" and numbers represent chunks of L video.

At 3D reproduction, they are read out from the optical disc 2 in the order of R[0], L[0], R[1], L[1], R[2], L[2], R[3], L[3], R[4], L[4], R[5], L[5], . . . , and decoded in the order of L[0], R[0], L[1], R[1], L[2], R[2], L[3], R[3], L[4], R[4], L[5], R[5], . . . . As described above, to decode the R video, it is necessary that the L video that had been referred to at encoding has been decoded. The chunk of R video and the chunk of L video with the same number are data necessary for reproduction at the same time and used as a set at 3D reproduction.

That is, for simplicity of explanation, the case where the entire reproduction time of the contents is equally divided into three is considered. Given that the start time of reproduction is zero, the times at which the entire reproduction time of the contents is equally divided into three are time-sequentially expressed by t1, t2, and the L video data necessary for the reproduction time from the start time of reproduction to the time t1 is divided as chunk L[0].

Further, the L video data necessary for the reproduction time from the time t1 to the time t2 is divided as chunk L[1], and the L video data necessary for the reproduction time from the time t2 to the end time is divided as chunk L[2].

In the same manner, regarding the R video streams, the R video data necessary for the reproduction time from the start time of reproduction to the time t1 is divided as chunk R[0].

Further, the R video data necessary for the reproduction time from the time t1 to the time t2 is divided as chunk R[1], and the R video data necessary for the reproduction time from the time t2 to the end time is divided as chunk R[2].

Thus divided and obtained respective chunks are arranged so that the chunks with the same numbers may be located in the order of the R video chunk and the L video chunk, and recorded in the optical disc 2. Note that, as shown in FIG. 5, both the L video stream and the R video stream are contained in one TS, the TS file is not interleaved but recorded in the optical disc 2.

[Management Structure of AV Streams]

Figure 8:
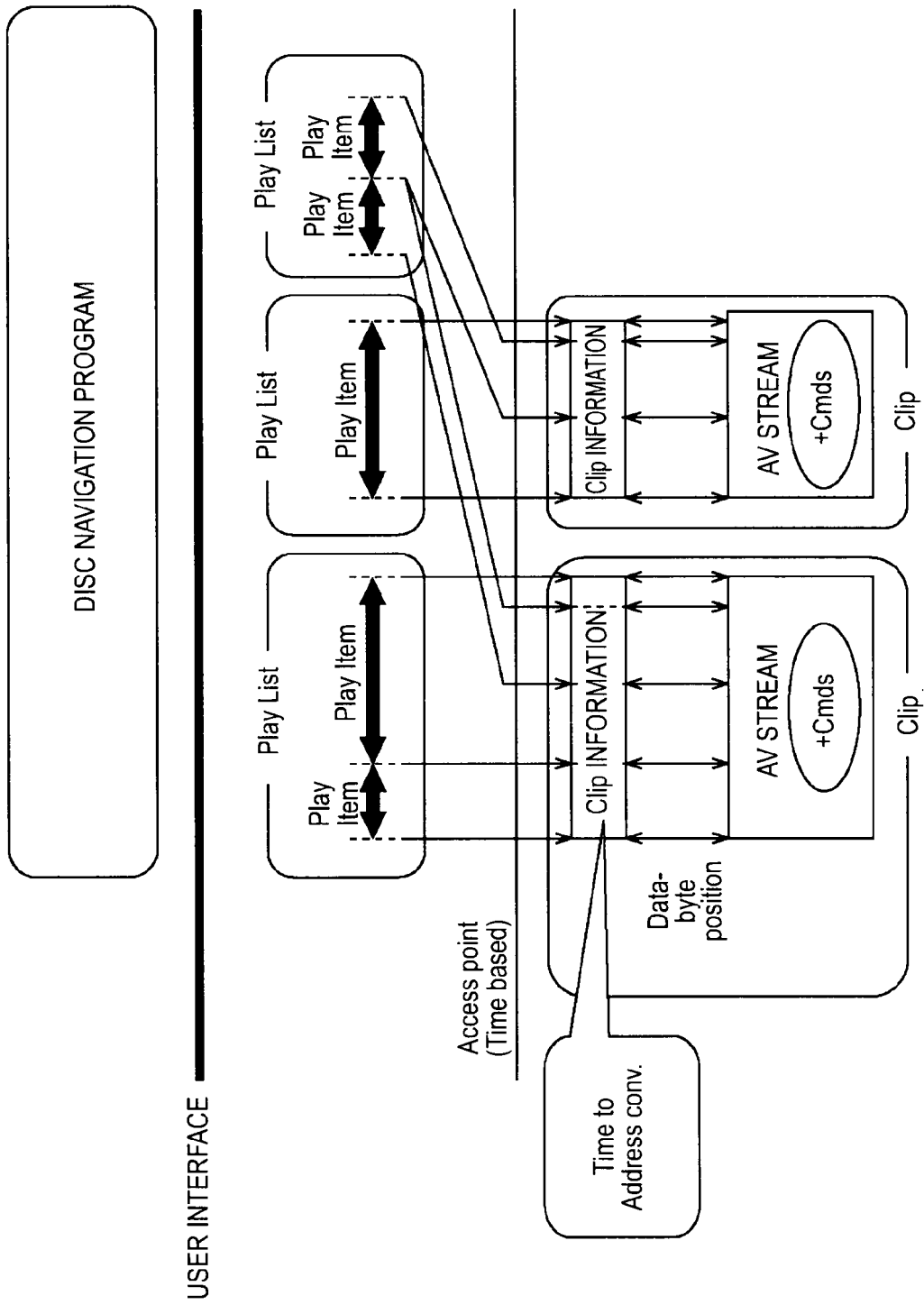
FIG. 8 shows an example of a management structure of AV streams.

FIG. 8 shows an example of a management structure of AV streams according to the reproducing device 1.

The management of AV streams is performed using two layers of PlayList and Clip as shown in FIG. 8. The AV streams may be recorded in the local storage of the reproducing device 1 not in the optical disc 2. Clip includes the AV stream as TS obtained by multiplexing of video data and audio data and corresponding Clip Information (Clip Information containing attribute information on the AV stream).

The AV stream is developed on the time axis, and the respective access points are designated by time stamp in the PlayLists. The Clip Information is used for finding an address at which decoding is to be started in the AV stream.

The PlayList is a collection of reproduction sections of the AV stream. One reproduction section in the AV stream is referred to as PlayItem. The PlayItem is expressed by a pair of IN point and OUT point of the reproduction section on the time axis. The PlayList includes one or some PlayItems.

The first PlayList from the left in FIG. 8 includes two PlayItems and the first half part and the second half part of the AV stream contained in the left Clip are respectively referred to by the two PlayItems.

The second PlayList from the left includes one PlayItem and the entire AV stream contained in the right Clip is referred to by it.

The third PlayList from the left includes two PlayItems and a part of the AV stream contained in the left Clip and a part of the AV stream contained in the right Clip are respectively referred to by the two PlayItems.

For example, in the case where the left PlayItem contained in the first PlayList from the left is designated as a target of reproduction by a navigation program, the first half part of the AV stream contained in the left Clip referred to by the PlayItem is reproduced. In this manner, the PlayList is used as reproduction control information for controlling the reproduction of the AV stream.

In the PlayList, a reproduction path including a sequence of one or more PlayItems is referred to as Main Path.

Further, in the PlayList, a reproduction path including a sequence of one or more SubPlayItems is referred to as Sub Path.

Figure 9:
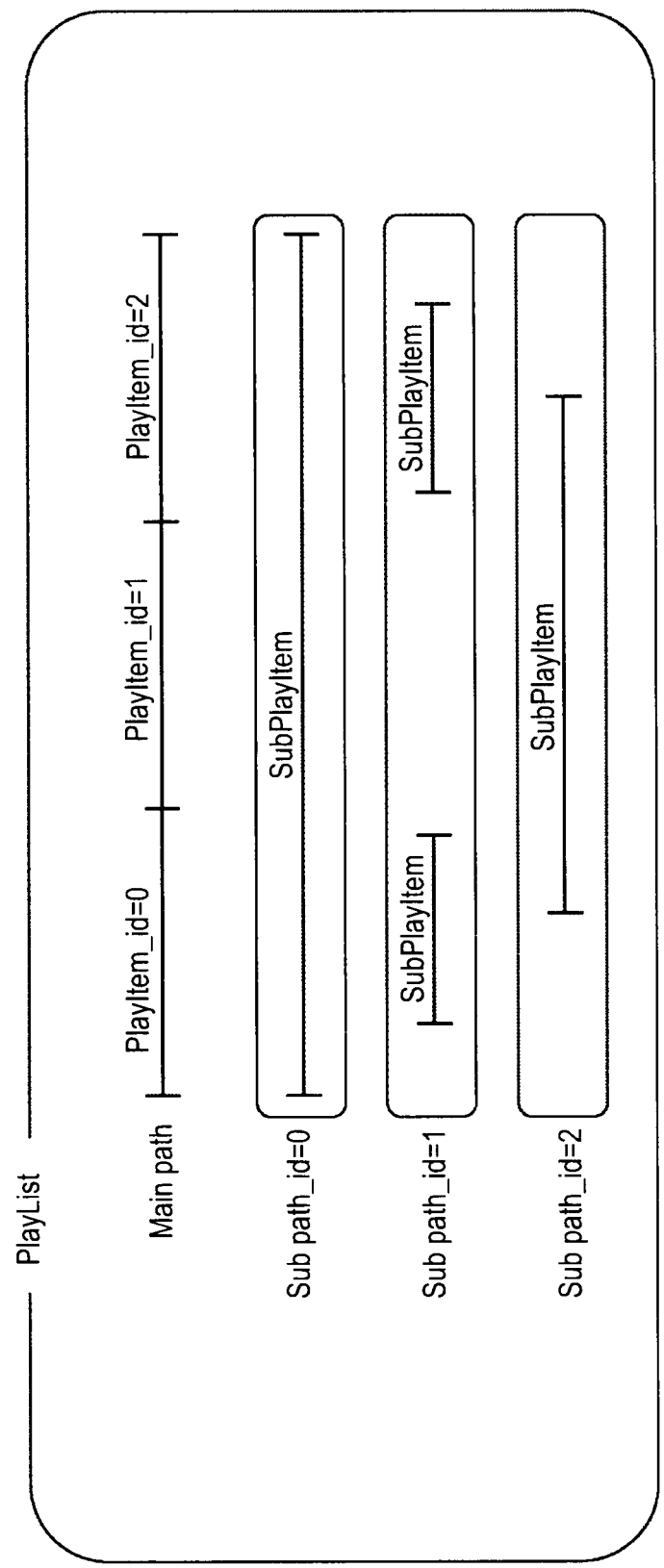
FIG. 9 shows structures of Main Path and Sub Paths.

FIG. 9 shows structures of Main Path and Sub Paths.

The PlayList may have one Main Path and one or more Sub Paths. The above described L video stream is referred to by the PlayItem forming the Main Path. Further, the R video stream is referred to by the SubPlayItem forming the Sub Path (Sub Path within the Extension( ), which will be described later).

The PlayList in FIG. 9 has one Main Path including a sequence of three PlayItems and three Sub Paths. For the PlayItems forming the Main Path, IDs are respectively and sequentially set from the first one. IDs are also respectively set for the Sub Paths.

In the example in FIG. 9, one SubPlayItem is contained in the Sub Path of Subpath_id=0, and two SubPlayItems are contained in the Sub Path of Subpath_id=1. Further, one SubPlayItem is contained in the Sub Path of Subpath_id=2.

The AV stream referred to by a certain PlayItem and the AV stream referred to by the SubPlayItem that designates the reproduction section in a time zone overlapping with that of the PlayItem are reproduced in synchronization. The management of AV streams using PlayList, PlayItem, SubPlayItem is disclosed in JP-A-2008-252740 and JP-A-2005-348314, for example.

[Directory Structure]

Figure 10:
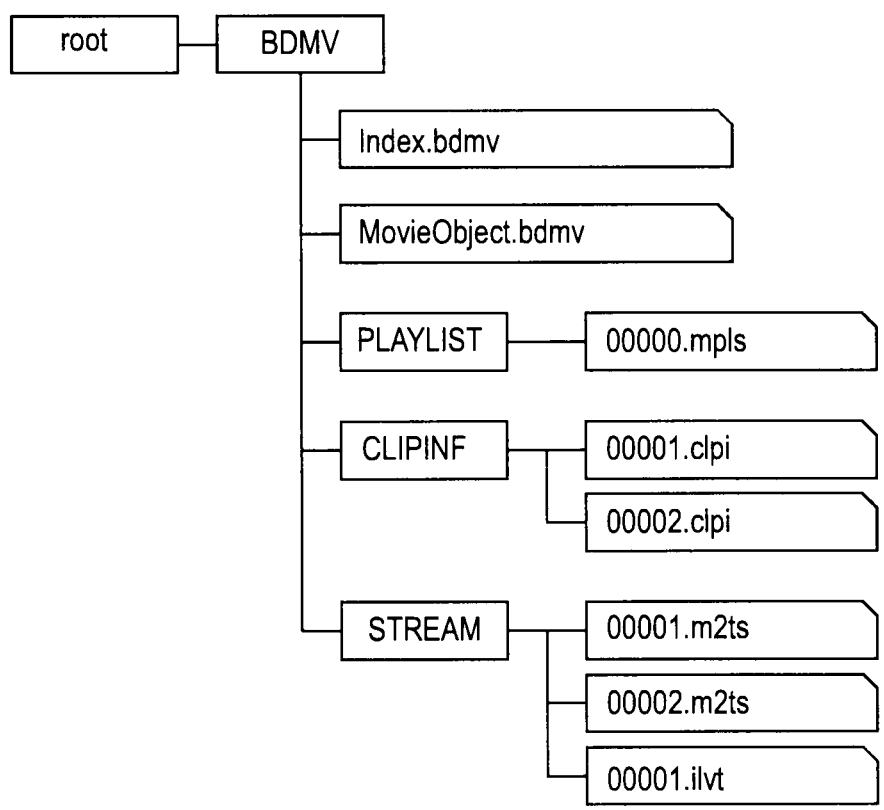
FIG. 10 shows an example of a management structure of files recorded in an optical disc.

FIG. 10 shows an example of a management structure of files recorded in the optical disc 2.

As shown in FIG. 10, the files are hierarchically managed using a directory structure. On the optical disc 2, one root directory is created. Under the root directory, there is a range managed by one recording and reproduction system.

Under the root directory, a BDMV directory is placed. Immediately under the BDMV directory, an Index file as a file for which a name "Index.bdmv" is set and a Movie Object file as a file for which a name "MovieObject.bdmv" is set are stored.

Under the BDMV directory, a PLAYLIST directory, a CLIPINF directory, a STREAM directory, etc. are provided.

In the PLAYLIST directory, PlayList files as files describing PlayLists are stored. For the respective PlayList files, names including five-digit numbers in combination with extensions ".mpls" are set. For the Playlist file shown in FIG. 10, a file name "00001.mpls" is set.

In the CLIPINF directory, Clip Information files as files describing Clip Information are stored. For the respective Clip Information files, names including five-digit numbers in combination with extensions ".clpi" are set.

For the two Clip Information files in FIG. 10, file names "00001.clpi" and "00002.clpi" are respectively set. Hereinafter, appropriately, the Clip Information file will be referred to as "clpi file".

The clpi file of "00001.clpi" is a file in which information on the corresponding L video stream is described, and the clpi file of "00002.clpi" is a file in which information on the corresponding R video stream is described.

In the STREAM directory, stream files are stored. For the respective stream files, names including five-digit numbers in combination with extensions ".m2ts" or names including five-digit numbers in combination with extensions ".ilvt" are set. Hereinafter, appropriately, the file for which the extension ".m2ts" is set will be referred to as "m2ts file" and the file for which the extension ".ilvt" is set will be referred to as "ilvt file".

The m2ts file of "00001.m2ts" is a file of the L video stream and the m2ts file of "00002.m2ts" is a file of the R video stream.

The ilvt file of "00001.ilvt" is a file, when the m2ts file of the L video stream file and the m2ts file of the R video stream file are interleaved, for managing the stream files and performing 3D reproduction. Therefore, in the case where the L video stream file and the R video stream are contained in one TS, but their m2ts files are not interleaved, the ilvt file is not recorded in the optical disc 2.

In addition to those shown in FIG. 10, under the BDMN directory, a directory that stores files of audio streams etc. are provided.

In the example of FIG. 10, the file name of the m2ts file forming the Clip on the L video is "00001.m2ts" and the file name of the clpi file is "00001.clpi". Further, the file name of the m2ts file forming the Clip on the R video is "00002.m2ts" and the file name of the clpi file is "00002.clpi". The file name of the m2ts file and the file name of the clpi file forming one Clip contains the same number.

In the file name of the ilvt file contains the same number "00001" as the five-digit number respectively contained in the file name of the m2ts file and the file name of the clpi file forming the Clip on L video. Thereby, the file name of the ilvt file to be designated at 3D reproduction may be specified from the file name of the clpi file forming the Clip on L video.

[Syntaxes of Respective Data]

FIG. 11 shows syntaxes of a PlayList file.

For convenience of explanation, numbers indicating the numbers of lines and ":" are shown on the left side of FIG. 11. The numbers indicating the numbers of lines and ":" do not form the PlayList. Note that, here, the main description of the PlayList will be explained, and the detailed explanation will be omitted. The details will be described in Blu-ray Disc Read Only Format part3, for example.

"yyyyy.mpls" on the 1st line shows the file name of the PlayList.

As shown in the 2nd line to the 5th lines, the PlayList file roughly includes fields of AppInfoPlayList( ), PlayList( ), PlayListMark( ), ExtensionData( ). In the PlayListMark( ) on the 4th line, information on user operation of commanding chapter jump etc. or marks as jump destinations by commands or the like is described.

The 7th line to the 11th line are the field of AppInfoPlayList( ). The AppInfoPlayList( ) contains MVC_flag as one-bit flag representing whether or not information on MVC reproduction (3D reproduction) is contained in the PlayList as shown on the 9th line. Note that the MVC_flag may be contained in a stream such as a video stream, not contained in the PlayList.

FIG. 12 shows meanings of MVC_flag.

As shown in FIG. 12, the value "0" of the MVC_flag shows that the information on 3D reproduction is not contained in the PlayList. That is, the optical disc in which the PlayList of MVC_flag=0 is a disc that does not support 3D reproduction.

The value "1" of the MVC_flag shows that the information on 3D reproduction is contained in the PlayList.

In the AppInfoPlayList( ), information on the type of the PlayList showing that the PlayList is for random reproduction or the like is contained in addition to the MVC_flag.

The 12th line to the 25th line are the field of PlayList( ). The number_of PlayItems on the 13th line shows the number of PlayItems in the PlayList. In the case of the example of FIG. 9, the number of PlayItems is three. The values of PlayItem_ids are assigned from zero in the order of appearance of PlayItem( ) in the PlayList. In the for loop on the 15th line to the 19th line, the PlayItem( ) is referred to by the number of PlayItems.

The number_of_SubPaths on the 14th line indicates the number of Sub Paths in the PlayList( ). In the case of the example of FIG. 9, the number of Sub Paths is three. The values of SubPath_ids are assigned from zero in the order of appearance of SubPath( ) in the PlayList. In the for loop on the 20th line to the 24th line, the SubPath( ) is referred to by the number of Sub Paths.

The 26th line to the 33rd line are a description of the PlayItem( ). The Clip_Information_file_name on the 27th line shows the name of the clpi file of the Clip containing the AV stream referred to by the PlayItem.

The MVC_file_type on the 28th line is 2-bit data having a valid value when the value of the MVC_flag is "1", and shows the types of the files as the respective supply sources of the L video stream and the R video stream.

FIG. 13 shows meanings of MVC_file_type.

As shown in FIG. 13, the value "0" of the MVC_file_type shows that the L video stream and the R video stream are contained in one TS and the m2ts file that manages the TS is indicated by the Clip_Information_file_name.

As described above, the file name of the m2ts and the file name of the clpi file forming a certain Clip contain the same number. The Clip_Information_file_name also indicates the file name of the corresponding m2ts file forming the same Clip as the clpi file for which the file name is set.

The value "1" of the MVC_file_type shows that the m2ts file (first TS file) of the L video stream and the m2ts file (second TS file) of the R video stream indicated by the Clip_Information_file_name are interleaved on the optical disc 2. In this case, the L video stream and the R video stream are respectively contained in different TS.

The value "2" of the MVC_file_type shows that both or one of the m2ts file of the L video stream and the m2ts file of the R video stream indicated by the Clip_Information_file_name is recorded in the local storage within the reproducing device 1.

The value "3" of the MVC_file_type is a reserved value.

Returning to the explanation of FIG. 11, the IN_time on the 30th line shows the start location of the reproduction section of the PlayItem, and the OUT_time on the 31st line shows the end location.

In the STN_table( ) on the 32nd line, information of the AV stream referred to by the PlayItem is contained. For example, as the information of the AV stream referred to by the PlayItem, a stream number (ID) and a PID of a transport packet forming the L video stream are contained.

The 34th line to the 40th line are description of the SubPath( ) contained in the PlayList( ). The SubPath( ) on the 34th line to the 40th line includes information on video data other than the R video and information on audio data reproduced together with the AV stream referred to by the PlayItem.

The SubPath_type on the 35th line is 8-bit data representing the type of the Sub Path.

FIG. 14 shows meanings of SubPath_type.

As shown in FIG. 14, the type of the Sub Path is indicated by the value from "2" to "7". For example, SubPath_type=2 indicates the SubPath of audio data used at slide show (Browsable slideshow) reproduction, and SubPath_type=3 indicates the SubPath of data at display of an interactive menu.

The number_of_SubPlayItems on the 36th line in FIG. 11 is 8-bit data indicating the number of SubPlayItems (number of entries) in one Sub Path( ). For example, the number_of_SubPlayItems of the SubPlayItem with SubPath_id=0 is "1", and the number_of_SubPlayItems of the SubPlayItem with SubPath_id=1 is "2". In the for loop on the 37th line to the 39th line, the SubPlayItem( ) is referred to by the number of SubPlayItems.

The 41st line to the 45th line are description of the SubPlayItem( ) contained in the SubPath( ). The Clip_Information_file_name on the 42nd line shows the name of the clpi file of the Clip referred to by the SubPlayItem.

The SubPlayItem_IN_time on the 43rd line shows the start location of the reproduction section of the SubPlayItem, and the SubPlayItem_OUT_time on the 44th line shows the end location.

The 46th line to the 49th line are ExtensionData( ) as an extension field.

When the value of the MVC_flag is "1", SubPath_entries_extension( ) and STN_table extension( ) are described in the ExtensionData( ). The SubPath_entries_extension( ) and STN_table extension( ) contain information on the R video stream used for 3D reproduction together with the L video stream referred to by the PlayItem.

The R video stream is managed as a stream referred to by the SubPath, and, as described above, the information on the R video stream is not described in the field of the SubPath( ) (the 34th line in FIG. 11), but described in the field of the ExtensionData( ).

In the case where the information on the R video stream has been described in the field of the SubPath( ), a failure may be caused if a player that does not support 3D reproduction loads the description. The information on the R video stream is described as ExtensionData( ) in advance and a player that supports 3D reproduction loads the description only when performing 3D reproduction, and thereby, the failure may be prevented.

FIG. 15 shows syntaxes of SubPath_entries_extension( ).

The number_of_SubPath_extensions is 16-bit data representing the number of SubPath_extensions, i.e., the number of SubPath_extension( ) appearing in the SubPath_entries_extension( ). In the for loop subsequent to the number_of_SubPath_extensions, the SubPath_extension( ) is referred to by the number of SubPaths.

Here, to the SubPath referring to the R video stream, an ID is also assigned as is the case of the normal Subpath referring to video data and audio data other than the R video on which information is described in the SubPath( ) on the 34th line in FIG. 11.

As shown in a for loop in FIG. 15, the ID of the SubPath referring to the R video stream is started from the same value as the value of the number_of_SubPaths on the 14th line in FIG. 11, and incremented one by one at each time when the SubPath_extension( ) is referred to. For example, in the case where the normal number of SubPaths is "3" and number_of_SubPaths=3 as shown in FIG. 9, if the number_of_SubPath_extensions is "2", "3" is assigned to the ID of the first SubPath and "4" is assigned to the ID of the second SubPath.

FIG. 16 shows syntaxes of the SubPath_extension( ) in FIG. 15.

Length is 32-bit data representing the number of bytes from immediately after the length field to the end of the SubPath_extension( ).

The SubPath_type_extension is formed by extending the SubPath_type, and 8-bit data representing the type of SubPath in which information is described in the SubPath_extension( ).

FIG. 17 shows meanings of SubPath_type_extension.

As shown in FIG. 17, values "0" to "7" of the SubPath_type_extension respectively represent the same meanings of the values "0" to "7" of the SubPath_type in FIG. 14.

The value "8" of the SubPath_type_extension shows that the SubPath for which SubPath_type_extension=8 is set is the SubPath referring to the R video stream. Further, the value shows that the m2ts file of the R video stream referred to is another file than the m2ts file of the L video stream referred to by the Play Item.

Returning to the explanation of FIG. 16, the number_of_SubPlayItems is 8-bit data representing the number of SubPlayItems in the SubPath_extension( ). In a for loop subsequent to the number_of_SubPlayItems, the SubPlayItem( ) is referred to by the number_of_SubPlayItems.

The description of the SubPlayItem( ) in the SubPath_extension is the same description of the SubPlayItem( ) shown on the 41st line to the 45th line in FIG. 11.

That is, the SubPlayItem( ) in the SubPath_extension contains Clip_Information_file_name showing the file name of the clpi file contained in the same Clip as that of the R video stream referred to by the SubPlayItem. Further, it contains the SubPlayItem_IN_time indicating the start location of the reproduction section and the SubPlayItem_OUT_time indicating the end location.

FIG. 18 shows syntaxes of STN_table_extension( ) contained in ExtensionData( ).

As described above, the STN_table (on the 32nd line in FIG. 11) contains a PID of a transport packet forming the L video stream referred to by the PlayItem. On the other hand, the STN_table_extension( ) contains a PID of a transport packet forming the R video stream referred to by the SubPath (SubPath_extension).

As shown in FIG. 18, the STN_table_extension( ) contains the length representing the length of the STN_table_extension( ), and subsequently, stream_entry( ) and stream_attributes( ) as attribute information of the R video stream as information on the R video stream.

FIG. 19 shows an example of syntaxes of stream_entry( ).

As shown in FIG. 19, the stream_entry( ) contains length representing the length of the stream_entry( ), and subsequently, type as 8-bit information.

For example, the value "1" of the type shows that the R video stream is contained in one TS together with the L video stream referred to by the PlayItem. Further, the value "2" of the type at least shows that the R video stream is contained in another TS than that of the L video stream referred to by the PlayItem.

When the value of the type is "1", ref_to_stream_PID_of_mainClip is referred to. The ref_to_stream_PID_of_mainClip represents the PID of the transport packet forming the R video stream contained in one TS together with the L video stream.

When the value of the type is "2", ref_to_SubPath_id, ref_to_subClip_entry_id, ref_to_stream_PID_of_subClip are referred to. Of the three pieces of information, the ref_to_SubPath_id represents the ID of the SubPath (SubPath_extension) referring to the R video stream. Further, the ref_to_stream_PID_of_subClip represents the PID of the transport packet forming the R video stream referred to by the SubPath identified by the ref_to_SubPath_id.

Figure 20:
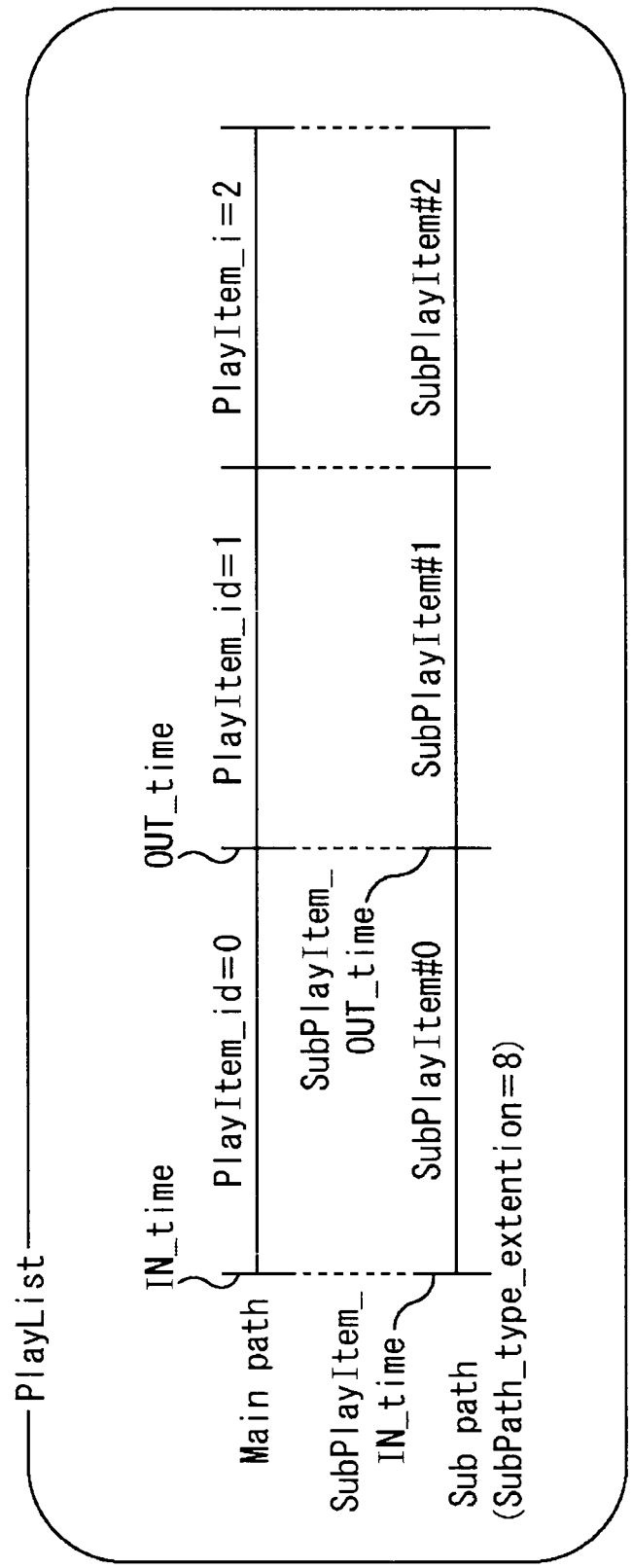
FIG. 20 shows relationships between PlayItems and SubPlayItems.

FIG. 20 shows relationships between the SubPath for which the SubPath_type_extension=8 is set and the MainPath referring to the L video stream to which the SubPath is related in the Playlist.

As described above, in each PlayItem( ), the IN_time indicating the start location of the reproduction section and the OUT_time indicating the end location of the PlayItem are contained (on the 30th line, 31st line in FIG. 11).

Further, as described above, in the SubPlayItem( ) in the SubPath_extension( ), with respect to each SubPlayItem forming the SubPath referring to the R video stream, the SubPlayItem_IN_time indicating the start location of the reproduction section and the SubPlayItem_OUT_time indicating the end location are contained.

As shown in FIG. 20, the start location and the end location of the PlayItem and the start location and the end location of the SubPlayItem referring to the R video stream related to the L video stream referred to by the PlayItem are the same, respectively.

For example, the IN_time and the OUT_time of the PlayItem to which PlayItem id=0 is assigned coincide with SubPlayItem_IN_time and SubPlayItem_OUT_time of SubPlayItem#0 related to the PlayItem to which PlayItem id=0 is assigned.

As described above, in the PlayList, SubPath( ) as the field in which information on SubPath is described is defined as SubPath_extension( ) in the ExtensionData( ) as the extension field, and further, the STN_table( ) as the field in which information on the stream number (STream Number) is described is defined as STN_table_extension( ).

Configuration Example of Reproducing Device 1

FIG. 21 is a block diagram showing a configuration example of the reproducing device 1.

A controller 31 executes a control program prepared in advance and controls the entire operation of the reproducing device 1.

A disk drive 32 reads out data from the optical disc 2 according to the control by the controller 31, and outputs the read out data to the controller 31, a memory 33, or a decode unit 36.

The memory 33 appropriately stores data necessary for execution of various kinds of processing by the controller 31.

A local storage 34 includes an HDD (Hard Disk Drive) or an SSD (Solid State Drive), for example. In the local storage 34, R video streams downloaded from a server 22 etc. are recorded. Also the streams recorded in the local storage 34 are appropriately supplied to the decode unit 36.

An Internet interface 35 communicates with the server 22 via a network 21 according to the control by the controller 31 and supplies data downloaded from the server 22 to the local storage 34.

From the server 22, data for updating the data recorded in the optical disc 2 is downloaded. As will be described later, 3D reproduction of contents may be performed using the downloaded R video stream in combination with the L video stream recorded in the optical disc 2.

The decode unit 36 decodes the stream supplied from the disk drive 32 or the local storage 34 and outputs obtained video signals to the display device 3. Audio signals are also output to the display device 3 via a predetermined route.

An operation input unit 37 includes an input device such as a button, a key, a touch panel, and a mouse and a receiving part that receives signals of infrared light or the like transmitted from a predetermined remote commander. The operation input unit 37 detects an operation of a user and supplies signals representing the detected operation to the controller 31.

FIG. 22 shows a configuration example of the decode unit 36.

A separation part 51 separates the data supplied from the disk drive 32 into Main TS data and Sub TS data according to the control by the controller 31.

The separation part 51 outputs the separated Main TS data to a read buffer 52 for storage and outputs the Sub TS data to a read buffer 55 for storage. Further, the separation part 51 outputs the Sub TS data supplied from the local storage 34 to the read buffer 55 for storage.

A PID filter 53 sorts the transport packet of the Main TS formed by the data stored in the read buffer 52 based on the PID. From the controller 31, the PID of the transport packet forming the L video stream specified based on the STN_table( ) of the PlayList (on the 32nd in FIG. 11) and the PID of the transport packet forming the R video stream specified based on the ref_to_stream_PID_of subClip of the STN_table_extension( ) (FIG. 19) are designated.

The PID filter 53 reads out the transport packet of the L video stream from the read buffer 52 and outputs it to an ES buffer 54 for storage. In the ES buffer 54, ES (Elementary Stream) of the L video is stored.

Further, when the R video stream is multiplexed together with the L video stream in the Main TS, the PID filter 53 extracts the transport packet of the R video stream based on the PID and outputs it to a switch 57.

A PID filter 56 reads out the transport packet of the R video stream contained in the Sub TS from the read buffer 55 and outputs it to the switch 57. From the controller 31, the PID of the transport packet forming the R video stream specified based on the ref_to_stream_PID_of subClip of the STN_table_extension( ) (FIG. 19) is designated.

Here, the processing of the L video, R video streams is being explained, however, as has been explained with reference to FIG. 5, graphics data such as PG and IG may be multiplexed in the Main TS. Similarly, graphics data such as PG and IG may be multiplexed in the Sub TS.

The PID filter 53 and the PID filter 56 appropriately sort the data as well based on the PIDs, and output them to predetermined output destinations. To terminals (circles) of the output destinations shown in the blocks of the PID filter 53 and the PID filter 56 in FIG. 22, decoders that decode graphics data etc. are connected.

The switch 57 outputs the transport packet of the R video stream contained in the Main TS supplied from the PID filter 53 to an ES buffer 58 for storage. Further, the switch 57 outputs the transport packet of the R video stream contained in the Sub TS supplied from the PID filter 56 to the ES buffer 58 for storage. In the ES buffer 58, ES of the R video is stored.

A switch 59 outputs the packet to be decoded of the packet of the L video stored in the ES buffer 54 and the packet of the R video stored in the ES buffer 58 to a decoder 60. Time information such as DTS (Decoding Time Stamp) is set for PES packets of the L video and the R video, and readout from the buffers is performed based on the time information.

The decoder 60 decodes the packet supplied form the switch 59 and outputs video signals of the L video or the R video obtained by decoding.

Specific Example 1 of PlayList File

FIG. 23 shows a specific example of a PlayList file.

FIG. 23 shows a part of the information shown in FIG. 11, etc. This is the same for the following specific examples of PlayLists.

The PlayList file in FIG. 23 is a PlayList file that controls 3D reproduction when the L video stream and R video stream are contained in the respective separate TS and the TS files are interleaved and recorded in the optical disc 2.

That is, MVC_flag=1 as shown in the AppInfoPlayList( ) in FIG. 23, and MVC_file_type=1 as shown in the PlayItem( ).

The Clip_Information_file_name of the PlayItem( ) is "00001". From the description, the clpi file forming the Clip of the L video is specified. Further, from the IN_time and the OUT_time of the PlayItem( ), the start location and the end location of the reproduction section of the PlayItem are respectively specified, and, from the STN_table( ), the PID of the transport packet forming the L video stream is specified.

In the ExtensionData( ), information on the SubPath referring to the R video stream is described. In this example, the normal number of SubPaths is "0" (the value of the number_of_SubPaths (on the 14th line in FIG. 11) is "0"), and SubPath_id=0 is assigned to the SubPath referring to the R video stream. In the SubPath_extension( ), SubPath_type_extension=8 indicating the SubPath referring to the R video stream is set.

The Clip_Information_file_name of the SubPlayItem( ) of the ExtensionData( ) is "00002". From the description, the clpi file forming the Clip of the R video is specified. Further, from the SubPlayItem_IN_time and the SubPlayItem_OUT_time of the SubPlayItem( ), the start location and the end location of the reproduction section of the SubPlayItem are respectively specified.

From the STN_table_extension( ), the ID "0" of the SubPath referring to the R video stream (ref_to_SubPath_id=0) and the PID of the transport packet forming the R video stream (ref_to_R_video_PID) are specified. In this example, the value of the type of the STN_table_extension( ) is "2".

FIGS. 24A and 24B show syntaxes of clpi files.

FIG. 24A shows an example of the clpi file of "00001.clpi".

Number_of_source_packets1 shows the number of source packets contained in the m2ts file of "00001.m2ts".

EP_map contains location information of the entry point (EP) set for the TS contained in the m2ts file of "00001.m2ts".

Chunk_map( ) contains location information of the respective chunks of the m2ts file of "00001.m2ts". The location of each chunk is indicted by Source Packet Number (SPN), for example. A specific example of the chunk_map( ) will be described later.

FIG. 24B shows an example of the clpi file of "00002.clpi".

Like the clpi file of "00001.clpi", the clpi file of "00002.clpi" contains number_of_source_packets2 showing the number of source packets contained in the m2ts file of "00002.m2ts", EP_map, and chunk_map( ).

FIG. 25 shows a concept of file management.

As shown in FIG. 25, management of the files interleaved and recorded in the optical disc 2 is performed in the form of a three-layer structure of a physical layer, a file system layer, and an application layer. The PlayList file in FIG. 23 and the clpi files in FIGS. 24A and 24B are information of the application layer handled by an application that manages reproduction of contents.

The physical layer is a layer of the optical disc 2 in which the m2ts file of the L video stream and the m2ts file of the R video stream are interleaved and recorded.

In the file system layer, the stream files (m2ts files, ilvt file) designated by the application are brought into correspondence with the locations of extents forming the respective stream files on the optical disc 2. The file system is a UDF file system, for example.

The extents refer to the respective collections of data continuously provided on the optical disc 2 of the entire data managed by a particular file.

That is, in the example of FIG. 25, in the m2ts file of "00001.m2ts", L[0], L[1] are the extents. When the m2ts file of "00001.m2ts" is designated as a readout file by the application, the respective locations of the L[0], L[1] on the optical disc 2 are specified by the UDF file system and read out by the disk drive 32.

In the m2ts file of "00002.m2ts", R[0], R[1] are the extents. When the m2ts file of "00002.m2ts" is designated as a readout file by the application, the respective locations of the R[0], R[1] on the optical disc 2 are specified by the UDF file system and read out by the disk drive 32.

In the ilvt file of "00001.ilvt", the whole R[0], L[0], R[1], L[1] are one extent. When the ilvt file of "00001.ilvt" is designated as a readout file by the application, the locations of the R[0], L[0], R[1], L[1] on the optical disc 2 are specified by the UDF file system and read out by the disk drive 32.

Example 1 of Reproduction Processing

Here, processing of 3D reproduction performed according to the PlayList file in FIG. 23 will be explained with reference to a flowchart in FIG. 26.

If MVC_flag=1, the controller 31 (the application that manages reproduction of contents executed in the controller 31) starts 3D reproduction in response to an operation for the operation unit 37 carried by a user.

At step S1, the controller 31 specifies the PID of the transport packet of the Main TS forming the L video stream from the description of the STN_table( ).

At step S2, the controller 31 specifies ref_to_SubPath_id=0 as the value of the SubPath_id of the SubPath referring to the R video stream, and further, specifies the PID of the transport packet of the Sub TS forming the R video stream from the description of the STN_table_extension( ).

At step S3, the controller 31 specifies the file name of the clpi file corresponding to the m2ts file of the Main TS containing the L video stream as "00001.clpi" from the Clip_Information_file_name in the PlayItem( ).

At step S4, the controller 31 specifies the file name of the clpi file corresponding to the m2ts file containing the R video stream as "00002.clpi" from the Clip_Information_file_name in the SubPlayItem( ) of the SubPath having SubPath_id=0 for which SubPath_type=8 is set in the SubPath_entries_extension( ).

At step S5, the controller 31 specifies the ilvt file of "00001.ilvt" containing the same five characters as the number (00001) contained in the file name of the file forming the Clip of the L video with extension of ilvt. As described above, the file name of the ilvt file contains the same number as the numbers contained in the names of the m2ts file and the clpi file forming the Clip of the L video.

At step S6, the controller 31 uses "00001.ilvt" specified at step S3 as a readout file and allows the disk drive 32 to readout it from the optical disc 2 through the UDF file system. The data of the L video stream and the R video stream read out from the disk drive 32 as the data of the ilvt file of "00001.ilvt" are supplied to the separation part 51 of the decode unit 36.

Note that, when random access is designated or the like and decoding is started from a predetermined EP contained in the EP_map, the data of and after the EP of the data of the readout file are readout. The EP_map contains location information of numbers of source packets for designating the locations of the respective EPs.

At step S7, the controller 31 controls the separation part 51 to separate the data read out from the optical disc 2 into data of L video and R video based on the chunk_map( ) of the clpi file of "00001.clpi" and the chunk_map( ) of the clpi file of "00002.clpi".

The data of the L video stream separated by the separation part 51 is output to the read buffer 52 and the data of the R video stream is output to the read buffer 55. The separation of data performed using the chunk_map( ) will be described later.

The transport packet of the data of the L video stream stored in the read buffer 52 is extracted by the PID filter 53 based on the PID specified at step S1, and the data is supplied to the decoder 60 via the ES buffer 54 and the switch 59. The transport packet of the data of the R video stream stored in the read buffer 55 is extracted by the PID filter 56 based on the PID specified at step S2, and the data is supplied to the decoder 60 via the switch 57, the ES buffer 58, and the switch 59.

At step S8, the decoder 60 decodes (reproduces) the packets sequentially supplied from the switch 59.

The 3D reproduction when the L video stream and R video stream are contained in the respective separate TS and the TS files are interleaved and recorded in the optical disc 2 is performed in the following manner.

[Separation of Data Using chunk_map( )]

FIG. 27 shows an example of a syntax of the chunk_map( ).

Number_of_chunks indicates the number of chunks referred to. After the number_of_chunks, information on the chunks is described by the number designated here.

SPN_chunk_start[i] shows, with the start location of the first chunk as reference, for example, the SPNs (Source Packet Number) (length) from the reference location to the start location of each chunk. The SPNs of the start locations of the respective chunks are sequentially described from that of the first chunk.

FIGS. 28A and 28B show specific examples including chunk_map( ).

FIG. 28A shows the clpi file of "00001.clpi", and number_of_source_packets is "number_of_source_packets1". Further, the number_of_chunks of the chunk_map( ) is "n+1" and the SPN_chunk_start[i] is 0, a1, a2, . . . , an.

The first value "0" of the SPN_chunk_start[i] shows that, with the start location of the first chunk of the m2ts file of "00001.m2ts" as reference, the SPN from the reference location to the start location of L[0] as the first chunk is "0" as shown in the middle part of FIG. 29.

The second value "a1" shows that the SPN from the reference location to the start location of L[1] as the second chunk is "a1".

The third value "a2" shows that the SPN from the reference location to the start location of L[2] as the third chunk is "a2".

The (n+1)th value "an" shows that the SPN from the reference location to the start location of L[n] as the last chunk is "an".

FIG. 28B shows the clpi file of "00002.clpi", and number_of_source_packets is "number_of_source_packets2". Further, the number_of_chunks of the chunk_map( ) is "n+1" and the SPN_chunk_start[i] is 0, b1, b2, . . . , bn.

The first value "0" of the SPN_chunk_start[i] shows that, with the start location of the first chunk of the m2ts file of "00002.m2ts" as reference, the SPN from the reference location to the start location of R [0] as the first chunk is "0" as shown in the top part of FIG. 29.

The second value "b1" shows that the SPN from the reference location to the start location of R [1] as the second chunk is "b1".

The third value "b2" shows that the SPN from the reference location to the start location of R[2] as the third chunk is "b2".

The (n+1) th value "bn" shows that the SPN from the reference location to the start location of R[n] as the last chunk is "bn".

When the data read out from the optical disc 2 is supplied, the separation part 51 separates data for the SPN corresponding to b1 of the supplied data as R[0] based on the description of the two chunk_map( ) as shown in the bottom part of FIG. 29. When the ilvt file of "00001.ilvt" is designated as a readout file, the respective data in the order of R[0], L[0], R[1], L[1], . . . , R[n], L[n] are supplied to the separation part 51.

Further, the separation part 51 separates the data for the SPN corresponding to a1 from the end location of R[0] as L[0] and separates the data for the SPN corresponding to b2-b1 from the end location of L[0] as R[1]. The separation part 51 separates the data for the SPN corresponding to a2-a1 from the end location of R[1] as L[1].

Similarly, the separation part 51 separates the data for the SPN corresponding to a value obtained by subtracting the value of bn from the value of the number_of_source_packets2 described in the clpi file of "00002.clpi" from the end location of L[n−1] as R [n]. The separation part 51 separates the data for the SPN corresponding to a value obtained by subtracting the value of an from the value of the number_of_source_packets1 described in the clpi file of "00001.clpi" from the end location of R[n] as L[n].

In this manner, the separation of the data by the separation part 51 is performed using the information of the lengths of the respective chunks described in the chunk_map( ).

Note that, when a value other than "1" is set for the MVC_file_type, the chunk_map( ) is optional. The player loading the PlayList in which a value other than "1" is set for the MVC_file_type should ignore the chunk_map( ) when the chunk_map( ) is in the PlayList.

When MVC_file_type=1, the corresponding two streams of the L video stream and the R video stream are divided into chunks in the same numbers, respectively. Regarding the interleaved R[i], L[i], the chunk of the L video stream and the chunk of the R video stream with the same values of index "i" have the same reproduction time.

FIG. 30 shows a syntax of EP_map( ) described in a clpi file.

EP_map( ) is referred to for specifying the decode start location when random access is made. The number_of_EP_entries indicates the number of EPs (entry points).

The description after the number_of_EP_entries is prepared for each EP. PTS_EP_start[i] indicates the PTS of EP and SPN_EP_start[i] indicates SPN of EP. In this manner, in the EP_map, the PTS and the SPN with respect to each entry point are registered in correspondence with each other. When the EP is designated, the readout start address is specified based on the PTS_EP_start[i] and SPN_EP_start[i] of the designated EP, and readout of files is performed.

Specific Example 2 of PlayList File

FIG. 31A shows another specific example of the PlayList file.

The PlayList in FIG. 31A is a PlayList that controls 3D reproduction when the L video stream and the R video stream are contained in the same TS. That is, the m2ts file of the L video stream and the m2ts file of the R video stream are not interleaved on the optical disc 2.

In this case, MVC_flag=1 as shown in the AppInfoPlayList( ) in FIG. 31A, and MVC_file_type=0 as shown in the PlayItem( ).

The Clip_Information_file_name of the PlayItem( ) is "00001". From the description, the clpi file forming the Clip of the L video is specified. Further, from the IN_time and the OUT_time of the PlayItem( ), the start location and the end location of the reproduction section of the PlayItem are respectively specified, and, from the STN_table( ), the PID of the transport packet forming the L video stream is specified.

From the STN_table extension( ) of the ExtensionData( ), the PID of the transport packet forming the R video stream is specified. In the case of the example, the value of the type of the STN_table_extension( ) is "1".

FIG. 31B shows a syntax of the clpi file of "00001.clpi".

As shown in FIG. 31B, the clpi file of "00001.clpi" contains EP_map. A value other than "1" is set for the MVC_file_type, and, in this example, the clpi file contains no chunk_map( ).

FIG. 32 shows a concept of file management performed based on the files in FIGS. 31A and 31B.

As shown in FIG. 32, one TS containing the L video stream and the R video stream is managed using the m2ts file of "00001.m2ts".

When the m2ts file of "00001.m2ts" is designated as a readout file by the application, the recording location of the m2ts file of "00001.m2ts" is specified by the UDF file system and read out by the disk drive 32. The respective transport packets forming the L video stream and the R video stream contained in the m2ts file of "00001.m2ts" are respectively separated based on the PID.

Example 2 of Reproduction Processing

Figure 33:
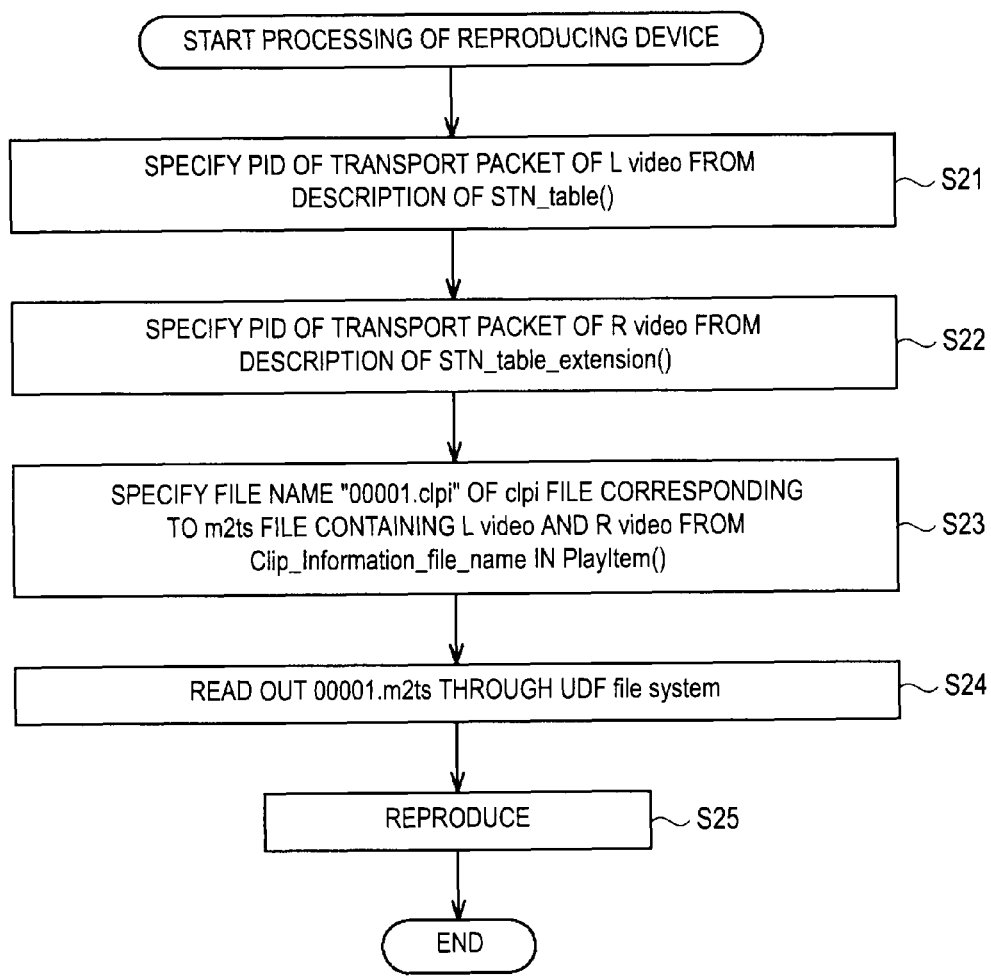
FIG. 33 is a flowchart for explanation of reproduction processing performed according to the PlayList file in FIG. 31A.

Processing of 3D reproduction performed according to the PlayList files in FIGS. 31A and 31B will be explained with reference to a flowchart in FIG. 33.

At step S21, the controller 31 specifies the PID of the transport packet of the Main TS forming the L video stream from the description of the STN_table( ).

At step S22, the controller 31 specifies the PID of the transport packet of the Main TS forming the R video stream from the description of the STN_table_extension( ).

At step S23, the controller 31 specifies the file name of the clpi file corresponding to the m2ts file containing the L video stream and the R video stream as "00001.clpi" from the Clip_Information_file_name in the PlayItem( ). MVC_flag=1 and MVC_file_type=0, and thus, one Main TS containing the L video stream and the R video stream is specified.

At step S24, the controller 31 uses "00001.m2ts" as a readout file and allows the disk drive 32 to read out it from the optical disc 2 through the UDF file system. The data of the m2ts file of "00001.m2ts" read out from the disk drive 32 is supplied to the read buffer 52 via the separation part 51 and stored therein.

From the data stored in the read buffer 52, the transport packet of the L video stream is extracted by the PID filter 53 based on the PID specified at step S21. The data of the extracted transport packet is supplied to the decoder 60 via the ES buffer 54 and the switch 59.

Further, from the data stored in the read buffer 52, the transport packet of the R video stream is extracted by the PID filter 53 based on the PID specified at step S22. The data of the extracted transport packet is supplied to the decoder 60 via the switch 57, the ES buffer 58, and the switch 59.

At step S25, the decoder 60 decodes (reproduces) the packets sequentially supplied from the switch 59.

3D reproduction when the L video stream and the R video stream are contained in the same TS is performed in the above described manner.

Specific Example 3 of PlayList File

FIG. 34 shows yet another specific example of the PlayList file.

The PlayList in FIG. 34 is a PlayList that controls 3D reproduction when the TS containing the L video stream is recorded in the optical disc 2 and the TS containing the R video stream is recorded in the local storage 34. For example, when the R video stream is downloaded from the server 22, the PlayList recorded in the optical disc 2 is updated by adding information on the R video stream, and recorded in the local storage 34 and managed by the controller 31.

MVC_flag=1 as shown in the AppInfoPlayList( ) in FIG. 34, and MVC_file_type=2 as shown in the PlayItem( ).

The Clip_Information_file_name of the PlayItem( ) is "00001". From the description, the clpi file forming the Clip of the L video is specified. Further, from the IN_time and the OUT_time of the PlayItem( ), the start location and the end location of the reproduction section of the PlayItem are respectively specified, and, from the STN_table( ), the PID of the transport packet forming the L video stream is specified.

In the ExtensionData( ), information on the SubPath referring to the R video stream is described. In this example, also, the normal number of SubPaths is "0" (the value of the number_of_SubPaths (on the 14th line in FIG. 11) is "0"), and SubPath_id=0 is assigned to the SubPath referring to the R video stream. As shown in FIG. 34, in the SubPath_extension( ), SubPath_type_extension=8 indicating the SubPath referring to the R video stream is set.

The Clip_Information_file_name of the SubPlayItem( ) of the ExtensionData( ) is "00003". From the description, the clpi file forming the Clip of the R video is specified. Also, the clpi file of "00003.clpi" has been downloaded from the server 22 together with the m2ts file of "00003.m2ts" as the file of the corresponding R video stream and stored in the local storage 34.

Further, from the SubPlayItem_IN_time and the SubPlayItem_OUT_time of the SubPlayItem( ) of the ExtensionData( ), the start location and the end location of the reproduction section of the SubPlayItem are respectively specified. From the STN_table_extension( ), the ID "0" of the SubPath referring to the R video stream (ref_to_SubPath_id=0) and the PID of the transport packet forming the R video stream (ref_to_R_video_PID) are specified. In the case of this example, the value of the type of the STN_table_extension( ) is "2".

FIGS. 35A and 35B show syntaxes of clpi files.

FIG. 35A shows an example of the clpi file of "00001.clpi". As shown in FIG. 35A, the clpi file of "00001.clpi" contains EP_map. FIG. 35B shows an example of the clpi file of "00003.clpi". As shown in FIG. 35B, the clpi file of "00003.clpi" also contains EP_map.

For example, the EP_map contained in the clpi file of "00001.clpi" and the EP_map contained in the clpi file of "00003.clpi" contain information of EPs respectively set at the same time with reference to the initial time t0 of the contents. The location of the L video stream for which reproduction is started using the EP_map contained in the clpi file of "00001.clpi" and the location of the R video stream for which reproduction is started using the EP_map contained in the clpi file of "00003.clpi" are locations at the same time on the time axis with reference to the time t0.

FIG. 36 shows a concept of file management performed using the files of FIGS. 34, 35A, and 35B.

As shown in FIG. 36, the TS containing the L video stream recorded in the optical disc 2 is managed using the m2ts file of "00001.m2ts". Further, the TS containing the R video stream recorded in the local storage 34 is managed using the m2ts file of "00003.m2ts".

In a BD, the data recorded in the BD and the data recorded in the local storage are managed using a virtual file system formed by merging the UDF file system that manages the data recorded in the BD, for example, and the file system that manages the data recorded in the local storage. A player containing the local storage generates the virtual file system and manages the data recorded in the BD and the data recorded in the local storage.

When the file to be read out is designated by an application, whether the file is recorded in the BD or recorded in the local storage and the address indicating the recording location on the recording media are specified by the virtual file system and the file is read out from the specified address of the specified recording media.

For example, when the m2ts file of "00001.m2ts" is designated by the application, the m2ts file of "00001.m2ts" recorded in a predetermined location of the optical disc 2 is specified by the virtual file system and read out by the disk drive 32.

Further, when the m2ts file of "00003.m2ts" is designated by the application, the m2ts file of "00003.m2ts" recorded in a predetermined location of the local storage 34 is specified by the virtual file system and read out.

Example 3 of Reproduction Processing

Processing of 3D reproduction performed according to the PlayList file in FIG. 34 will be explained with reference to a flowchart in FIG. 37.

At step S41, the controller 31 specifies the PID of the transport packet of the Main TS forming the L video stream from the description of the STN_table( ).

At step S42, the controller 31 specifies ref_to_SubPath_id=0 as the value of the SubPath_id of the SubPath referring to the R video stream and specifies the PID of the transport packet forming the R video stream from the description of the STN_table_extension( ).

At step S43, the controller 31 specifies the file name of the clpi file corresponding to the m2ts file of the Main TS containing the L video stream as "00001.clpi" from the Clip_Information_file_name in the PlayItem( ).

At step S44, the controller 31 specifies the file name of the clpi file corresponding to the m2ts file containing the R video stream as "00003.clpi" from the Clip_Information_file_name in the SubPlayItem( ) of the SubPath having SubPath_id=0 for which SubPath_type=8 is set in the SubPath_entries_extension( ).

At step S45, the controller 31 uses "00001.m2ts" as a readout file and allows the disk drive 32 to read out it from the optical disc 2 through the virtual file system.

At step S46, the controller 31 uses "00003.m2ts" as a readout file and reads out it from the local storage 34 through the virtual file system.

The data of the m2ts file of "00001.m2ts" read out by the disk drive 32 is supplied to the read buffer 52 via the separation part 51 and stored therein. The transport packet of the data of the L video stream stored in the read buffer 52 is extracted by the PID filter 53 based on the PID specified at step S41, and the data is supplied to the decoder 60 via the ES buffer 54 and the switch 59.

On the other hand, the data of the m2ts file of "00003.m2ts" read out from the local storage 34 is supplied to the read buffer 55 via the separation part 51 and stored therein. The transport packet of the data of the R video stream stored in the read buffer 55 is extracted by the PID filter 56 based on the PID specified at step S42, and the data is supplied to the decoder 60 via the switch 57, the ES buffer 58, and the switch 59.

At step S47, the decoder 60 decodes (reproduces) the packets sequentially supplied from the switch 59.

3D reproduction when the TS containing the L video stream is recorded in the optical disc 2 and the TS containing the R video stream is recorded in the local storage 34 is performed in the above described manner.

Regarding Managed Copy

Embodiment 1

Copying of 3D image contents (3D contents) recorded in the optical disc 2 in the local storage 34 using Managed Copy will be explained.

When the 3D contents recorded in the optical disc 2 are copied in the local storage 34, authentication between the server 22 and the controller 31 of the reproducing device 1 is appropriately performed. The server 22 is an authentication server for the case where Managed Copy of the 3D contents recorded in the optical disc 2 is performed.

Figure 38:
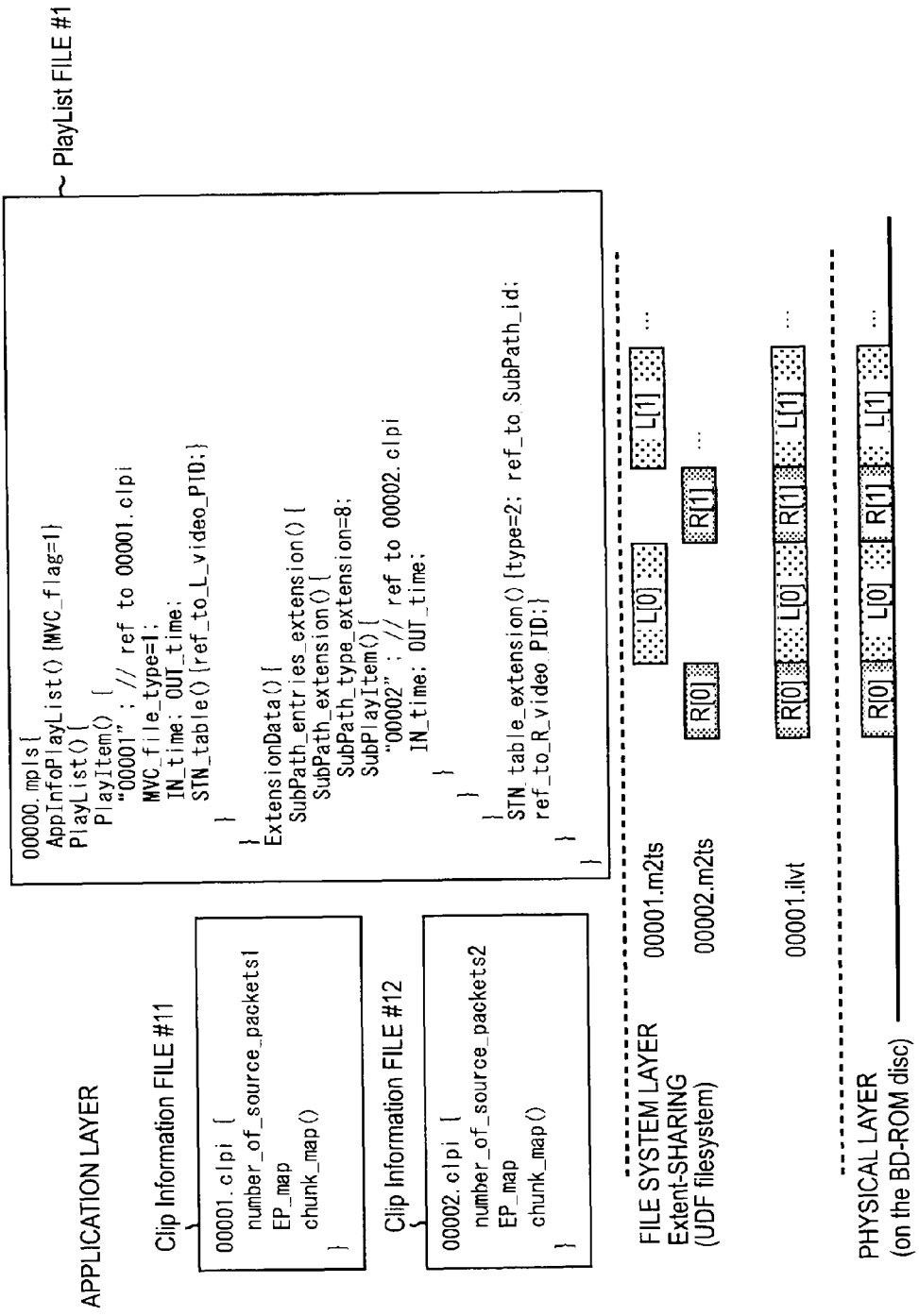
FIG. 38 shows a concept of file management of 3D contents to be copied.

FIG. 38 shows a concept of file management of 3D contents to be copied.

As has been explained with reference to FIG. 25 etc., the management of the data recorded in the optical disc 2 is performed in the form of the three-layer structure of the physical layer, the file system layer, and the application layer.

The PlayList file #1 shown in FIG. 38 as information of the application layer is the same as the PlayList file in FIG. 23.

That is, the PlayList file #1 is a PlayList file that controls 3D reproduction when the L video stream and the R video stream are contained in separate TS and the TS files (m2ts files) are interleaved and recorded in the optical disc 2. The value of the MVC_flag is "1" and the value of the MVC_file_type is also "1". In the ExtensionData( ), information on the SubPath referring to the R video stream is described.

Further, Clip Information files #11, #12 shown in FIG. 38 are the same as the clpi file in FIG. 24A and the clpi file in FIG. 24B, respectively.

The Clip Information file #11 is a clpi file forming the Clip of the L video. In the Clip Information file #11, number_of_source_packets1, EP_map, chunk_map( ) are contained.

The number_of_source_packets1 indicates the number of source packets contained in the m2ts file of "00001.m2ts", and the EP_map of the Clip Information file #11 contains a location of the entry point set for the m2ts file of "00001.m2ts". The chunk_map( ) in the Clip Information file #11 shows the locations of the respective chunks of the m2ts file of "00001.m2ts".

The Clip Information file #12 is a clpi file forming the Clip of the R video. In the Clip Information file #12, number_of_source_packets2, EP_map, chunk_map( ) are contained. The number_of_source_packets2 indicates the number of source packets contained in the m2ts file of "00002.m2ts", and the EP_map of the Clip Information file #12 contains a location of the entry point set for the m2ts file of "00002.m2ts". The chunk_map( ) in the Clip Information file #12 shows the locations of the respective chunks of the m2ts file of "00002.m2ts".

The respective m2ts files of "00001.m2ts", "00002.m2ts" and the ilvt file of "00001.ilvt" shown as information of the file system layer in FIG. 38 are the same as the respective files in FIG. 25.

The m2ts file of "00001.m2ts" is a file that manages the L video stream and the m2ts file of "00002.m2ts" is a file that manages the R video stream. The ilvt file of "00001.ilvt" is a file that manages the m2ts file of the L video stream and the m2ts file of the R video stream interleaved and recorded with respect to each predetermined data unit by the function of extent-sharing of the UDF file system.

When the m2ts file of the L video stream and the m2ts file of the R video stream are interleaved and recorded in the optical disc 2, the L video stream and the R video stream are managed by the three files.

As shown in FIG. 38 as information of the physical layer, on the optical disc 2, the chunks forming the L video stream and the chunks forming the R video stream are interleaved and recorded.

The case where the 3D contents having the management structure are copied in the local storage 34 will be explained. The file system supported by the local storage 34 is FAT (File Allocation Table), for example, and extent-sharing is not supported.

The case where "00001.m2ts", "00002.m2ts", "00001.ilvt" that may be specified based on the description of the PlayList file #1 in the above described manner are read out from the optical disc 2 and copied in the local storage 34 will be considered.

Figure 39:
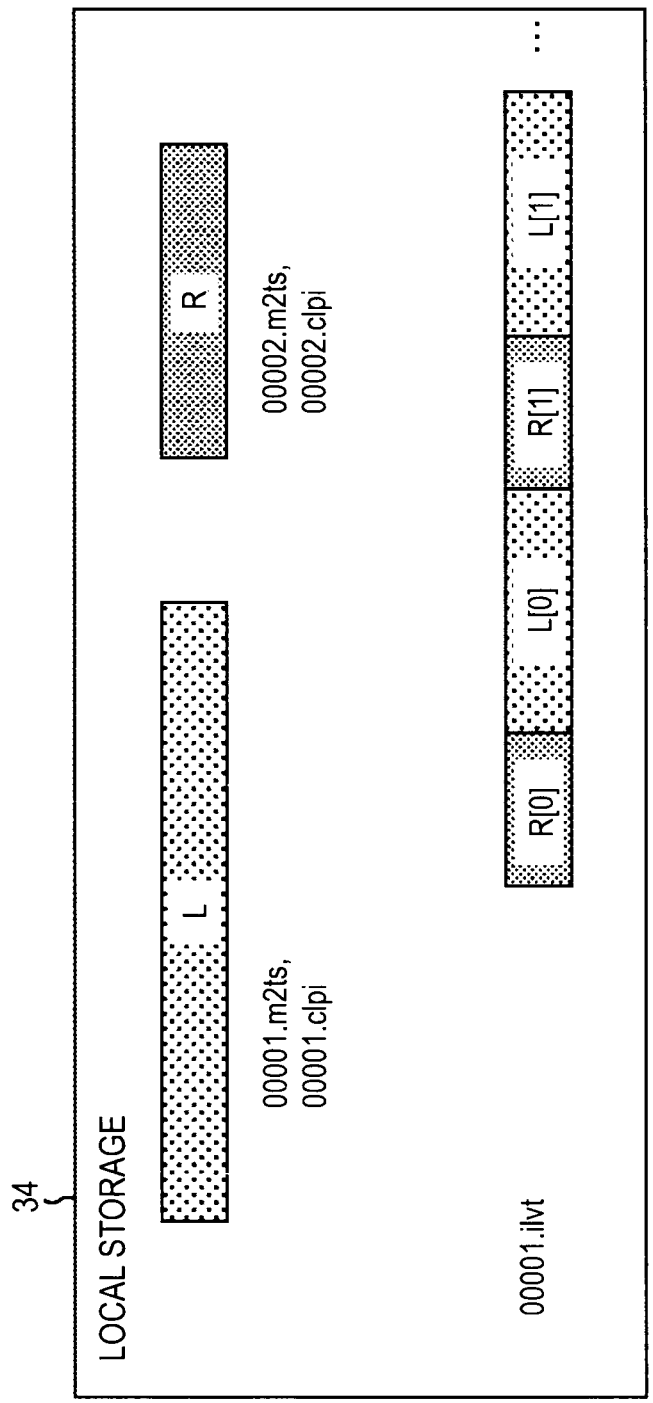
FIG. 39 is a diagram for explanation of a problem.

In this case, as shown in FIG. 39, in the local storage 34, the L video stream managed by the m2ts file of "00001.m2ts" and the R video stream managed by the m2ts file of "00002.m2ts" are copied. Further, the interleaved L video, R video streams managed by the ilvt file of "00001.ilvt" are respectively copied. In the example of FIG. 39, two clpi files of "00001.clpi", "00002.clpi" are copied in correspondence with the two m2ts files of "00001.m2ts", "00002.m2ts", respectively.

As a result, given that the data volume of the L video stream and the R video stream interleaved and recorded in the optical disc 2 is 25 GB, data of 50 GB twice in the data volume is recorded in the local storage 34.

The reason that the L video stream and the R video stream interleaved and recorded in the optical disc 2 is that it is necessary to alternately read out the L video data and the R video data coded with reference to the data for display of 3D images, and reading out of data is late for reproduction because seeking takes long time when the readout speed of the optical disc 2 is lower and the respective data are recorded in different regions in the manner that the entire R video stream is recorded after the entire L video stream.

The local storage 34 as an HDD or an SSD is a recording medium at the higher readout speed compared to that of the optical disc 2, and, even when the L video stream and the R video stream are recorded in the respective different regions, the data may be read out in time for reproduction. The interleaved L video, R video streams copied with the ilvt file of "00001.ilvt" designated as the readout file are regarded as wasteful data in view of the capacity of the local storage 34.

In the reproducing device 1, the wasteful data is not copied, but copying of 3D contents recorded in the optical disc 2 is efficiently be performed.

Figure 40:
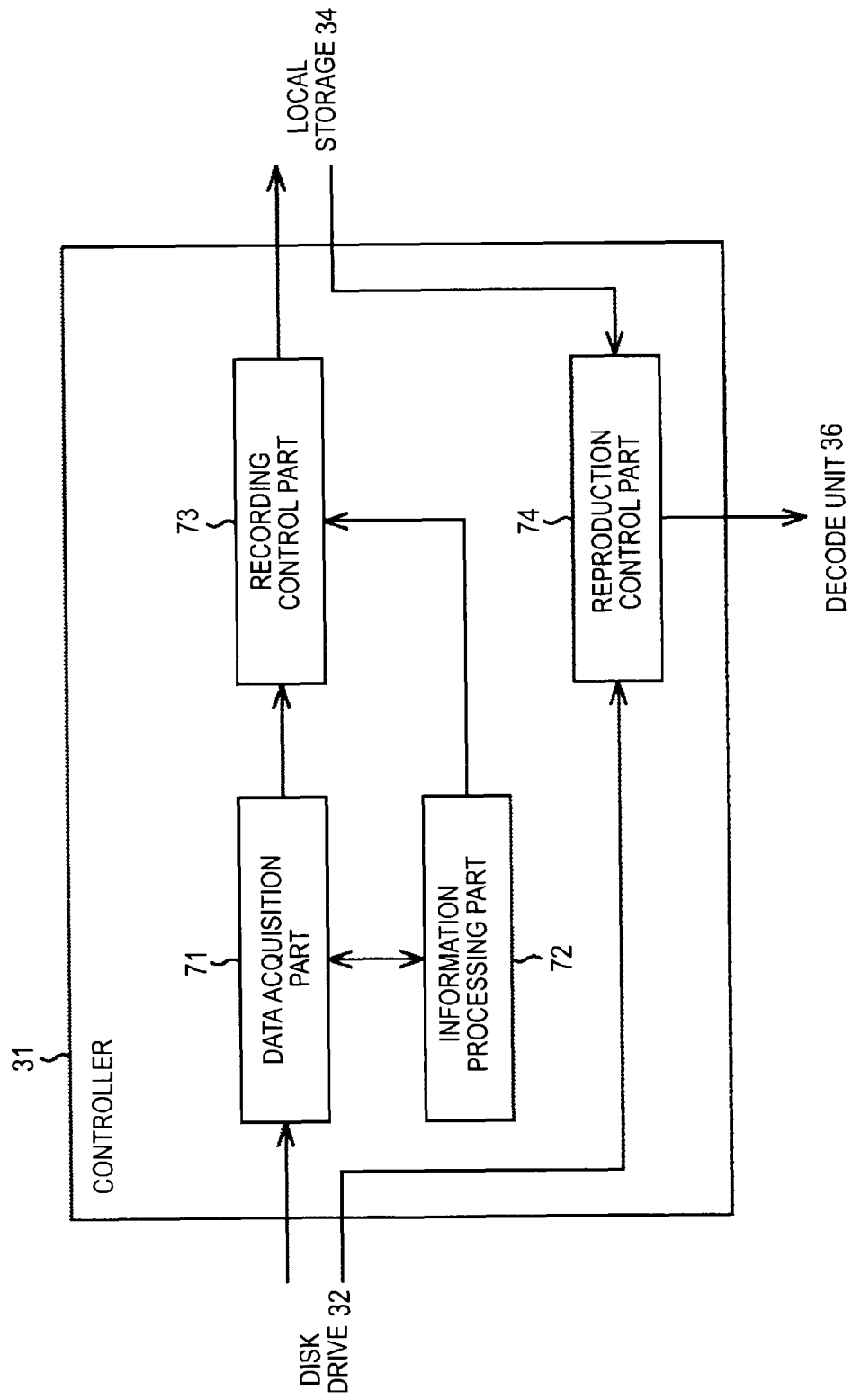
FIG. 40 is a block diagram showing a functional configuration example of a controller.

FIG. 40 is a block diagram showing a functional configuration example of the controller 31.

As shown in FIG. 40, in the controller 31, a data acquisition part 71, an information processing part 72, a recording control part 73, and a reproduction control part 74 are realized. At least a part of the functional part shown in FIG. 40 is realized when a predetermined program is executed by a CPU (Central Processing Unit, not shown) within the controller 31. By the respective parts in FIG. 40, copying of 3D contents recorded in the optical disc 2 and reproduction of the 3D contents copied in the local storage 34 are performed.

The data acquisition part 71 controls the disk drive 32 and reads out various kinds of data from the optical disc 2. For example, the data acquisition part 71 reads out and acquires a certain PlayList file as reproduction control information of 3D contents to be copied from the optical disc 2 and outputs it to the information processing part 72.

Further, the data acquisition part 71 reads out and outputs the clpi files of the Clips of the L video and R video to the information processing part 72, and reads out and outputs the m2ts files of the Clips of the L video and R video to the recording control part 73 according to the control by the information processing part 72.

The information processing part 72 determines whether or not the mt2s file of the L video stream and the mt2s file of the R video stream are interleaved in predetermined data units and recorded on the optical disc 2 based on the value of the MVC_file_type contained in the PlayList file supplied from the data acquisition part 71.

As has been explained with reference to FIG. 13, the value "1" of the MVC_file_type shows that the mt2s file of the L video stream and the mt2s file of the R video stream are interleaved and recorded on the optical disc 2. The information processing part 72 determines that the mt2s file of the L video stream and the mt2s file of the R video stream are interleaved and recorded on the optical disc 2 when the value of the MVC_file_type is "1". Further, the information processing part 72 determines that the files are not interleaved but recorded when the value of the MVC_file_type is a value other than "1".

When determining that the mt2s file of the L video stream and the mt2s file of the R video stream are interleaved and recorded on the optical disc 2, the information processing part 72 allows the data acquisition part 71 to respectively read out the mt2s file that manages the L video stream and the mt2s file that manages the R video stream. The mt2s files read out by the data acquisition part 71 are supplied to the recording control part 73 and recorded (copied) in the local storage 34.

Further, the information processing part 72 deletes the chunk_map( ) from the clpi file corresponding to the m2ts file copied in the local storage 34 and outputs the clpi file from which the chunk_map( ) has been deleted to the recording control part 73.

Furthermore, the information processing part 72 changes the value of the MVC_file_type from "1" to "2", and outputs the PlayList file in which the value of the MVC_file_type has been changed to the recording control part 73. The PlayList file in which the value of the MVC_file_type has been changed is used as reproduction control information of the stream copied in the local storage 34.

The recording control part 73 records the mt2s file that manages the L video stream and the mt2s file that manages the R video stream supplied from the data acquisition part 71 in the local storage 34. Further, the recording control part 73 records the PlayList file in which contents have been changed by the information processing part 72 and the clpi file from which the chunk_map( ) has been deleted in the local storage 34.

When reproduction of the 3D contents copied in the local storage 34 is commanded, the reproduction control part 74 controls the reproduction of the copied 3D contents based on a new PlayList recorded in the local storage 34. Note that the respective reproduction processing that have been explained with reference to FIGS. 26, 33, and 37 are performed by the reproduction control part 74.

Example of Copy Processing

Here, processing of the reproducing device 1 of copying 3D contents in FIG. 38 recorded in the optical disc 2 in the local storage 34 will be explained with reference to a flowchart in FIG. 41.

At step S101, the data acquisition part 71 reads out the PlayList file #1 as the PlayList file of the 3D contents to be copied from the optical disc 2. The PlayList file #1 is acquired by the data acquisition part 71 and supplied to the information processing part 72.

At step S102, the information processing part 72 recognizes reference to the ilvt file in the PlayList file #1 based on the value "1" of the MVC_file_type. The reference to the ilvt file in the PlayList file means that the m2ts file of the L video stream and the m2ts file of the R video stream are interleaved and recorded in the optical disc 2.

At step S103, the information processing part 72 specifies the file name of the clpi file corresponding to the m2ts file of the Main TS containing the L video stream as "00001.clpi" from the Clip_Information_file_name in the PlayItem( ). In the PlayList file #1, the Clip_Information_file_name of the PlayItem( ) is "00001", and, from the description, the file name of the clpi file forming the Clip of the L video is specified in the above described manner.

At step S104, the information processing part 72 specifies the SubPath referring to the R video stream for which SubPath_id=0 and SubPath_type_extension=8 are set in the SubPath_entries_extension( ). Further, the information processing part 72 specifies the file name of the clpi file corresponding to the m2ts file containing the R video stream as "00002.clpi" from the Clip_Information_file_name in the SubPlayItem( ) of the specified SubPath.

At step S105, the data acquisition part 71 reads out the Clip Information files #11, #12 from the optical disc 2 based on the file names specified by the information processing part 72. The file name of the Clip Information file #11 is "00001.clpi" and the file name of the Clip Information file #12 is "00002.clpi".

At step S106, the information processing part 72 specifies "00001.ilvt" containing the same five characters as the number (00001) contained in the file names of the files (m2ts files, clpi files) forming the Clip of the L video with extension of ilvt. Here, the ilvt file with the specified file name is handled as a file not to be copied.

At step S107, the information processing part 72 controls the data acquisition part 71 to designate "00001.m2ts" containing the same five characters as the number contained in "00001.clpi" with extension of m2ts as a readout file and read out it from the optical disc 2. The recording control part 73 copies the m2ts file of "00001.m2ts" read out from the data acquisition part 71, i.e., the L video stream in the local storage 34.

At step S108, the information processing part 72 controls the data acquisition part 71 to designate "00002.m2ts" containing the same five characters as the number contained in "00002.clpi" with extension of m2ts as a readout file and read out it from the optical disc 2. The recording control part 73 copies the m2ts file of "00002.m2ts" read out from the data acquisition part 71, i.e., the R video stream in the local storage 34.

At step S109, the information processing part 72 deletes the chunk_map( ) from the clpi file of "00001.clpi" read out at step S105 and outputs it as a new Clip Information file #11 to the recording control part 73. The recording control part 73 copies the new Clip Information file #11 supplied from the information processing part 72 in the local storage 34.

At step S110, the information processing part 72 deletes the chunk_map( ) from the clpi file of "00002.clpi" read out at step S105 and outputs it as a new Clip Information file #12 to the recording control part 73. The recording control part 73 copies the new Clip Information file #12 supplied from the information processing part 72 in the local storage 34.

At step S111, the information processing part 72 changes the value of the MVC_file_type of the PlayList file #1 from "1" to "2", and outputs it as a new PlayList file #1 to the recording control part 73. The recording control part 73 copies the new PlayList file #1 supplied from the information processing part 72 in the local storage 34.

FIG. 42 shows the PlayList file #1 in which the value of MVC_file_type has been changed.

As shown by an underline, the value of the MVC_file_type is changed from "1" to "2" by the information processing part 72. As has been explained with reference to FIG. 13, the value "2" of the MVC_file_type shows that both or one of the m2ts file of the L video stream and the m2ts file of the R video stream is recorded in the local storage 34.

The PlayList #1 containing the description in FIG. 42 is recorded in the local storage 34 together with the m2ts file that manages the L video stream and the m2ts file that manages the R video stream, and used as reproduction control information for the copied 3D contents.

FIG. 43 shows Clip Information files #11, #12 from which chunk_map( ) has been deleted.

As shown in FIG. 43, the chunk_map( ) respectively contained in the Clip Information files #11, #12 are deleted by the information processing part 72. The Clip Information file #11 containing the description in FIG. 43 is recorded as the clpi file forming the Clip of the L video in correspondence with the m2ts file that manages the L video stream in the local storage 34. Further, the Clip Information file #12 containing the description in FIG. 43 is recorded as the clpi file forming the Clip of the R video in correspondence with the m2ts file that manages the R video stream in the local storage 34.

Figure 44:
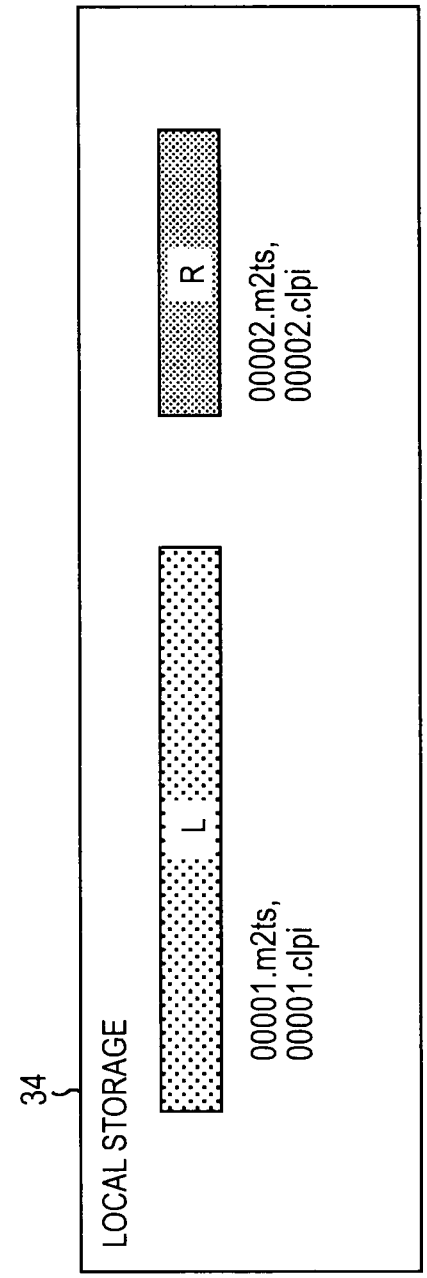
FIG. 44 shows a status of a local storage after copying.

FIG. 44 shows a status of the local storage 34 after copying.

Figure 41:
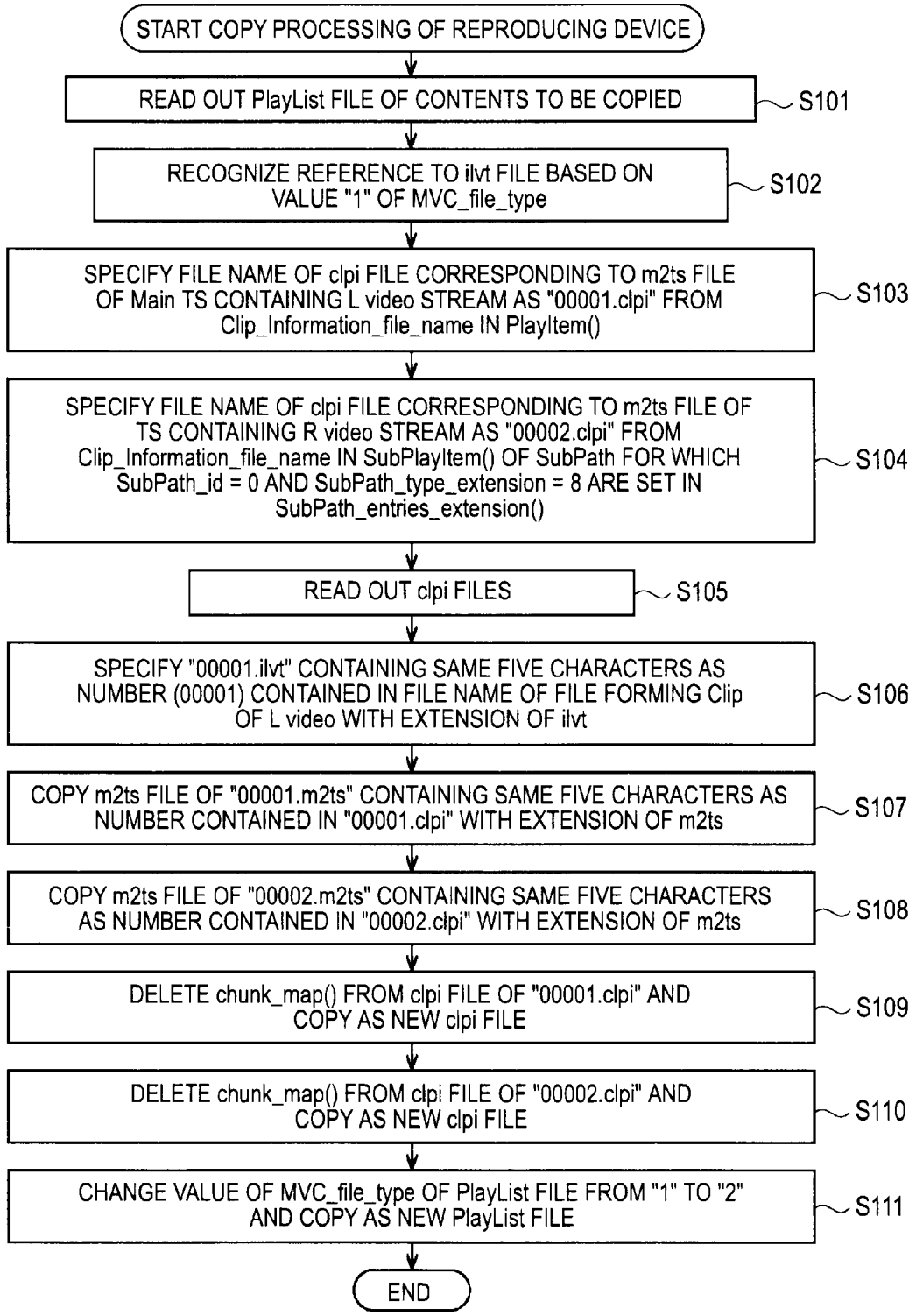
FIG. 41 is a flowchart for explanation of processing of the reproducing device of copying the 3D contents in FIG. 38.

In the local storage 34 after copying is performed by the processing in FIG. 41, the L video stream managed by the m2ts file of "00001.m2ts" and the R video stream managed by the m2ts file of "00002.m2ts" are recorded. Further, the clpi file of "00001.clpi" (Clip Information file #11) is recorded in correspondence with the m2ts file of "00001.m2ts" and the clpi file of "00002.clpi" (Clip Information file #12) is recorded in correspondence with the m2ts file of "00002.m2ts".

Also, the PlayList file #1 is recorded in the local storage 34. As shown in FIG. 44, the interleaved and recorded L video stream and R video stream managed by the ilvt file of "00001.ilvt" are not copied.

In this manner, copying may efficiently be performed by copying only the L video stream and the R video stream managed by the m2ts files but not copying the streams interleaved and recorded in the optical disc 2. Given that the entire data volume of the L video stream and the R video stream interleaved and recorded in the optical disc 2 is 25 GB, data in the same volume is recorded in the local storage 34.

Further, the copied 3D contents may be reproduced based on the information after change by changing contents of the PlayList file and the clpi files. As has been explained with reference to FIGS. 28A to 29, the chunk_map( ) contained in the clpi files are used for reading out of the interleaved and recorded data. In the local storage 34, the L video stream and the R video stream are not interleaved but recorded, the chunk_map( ) is unnecessary information and deleted from the clpi files at copying.

Example of Reproduction Processing of Copied 3D Contents

Figure 45:
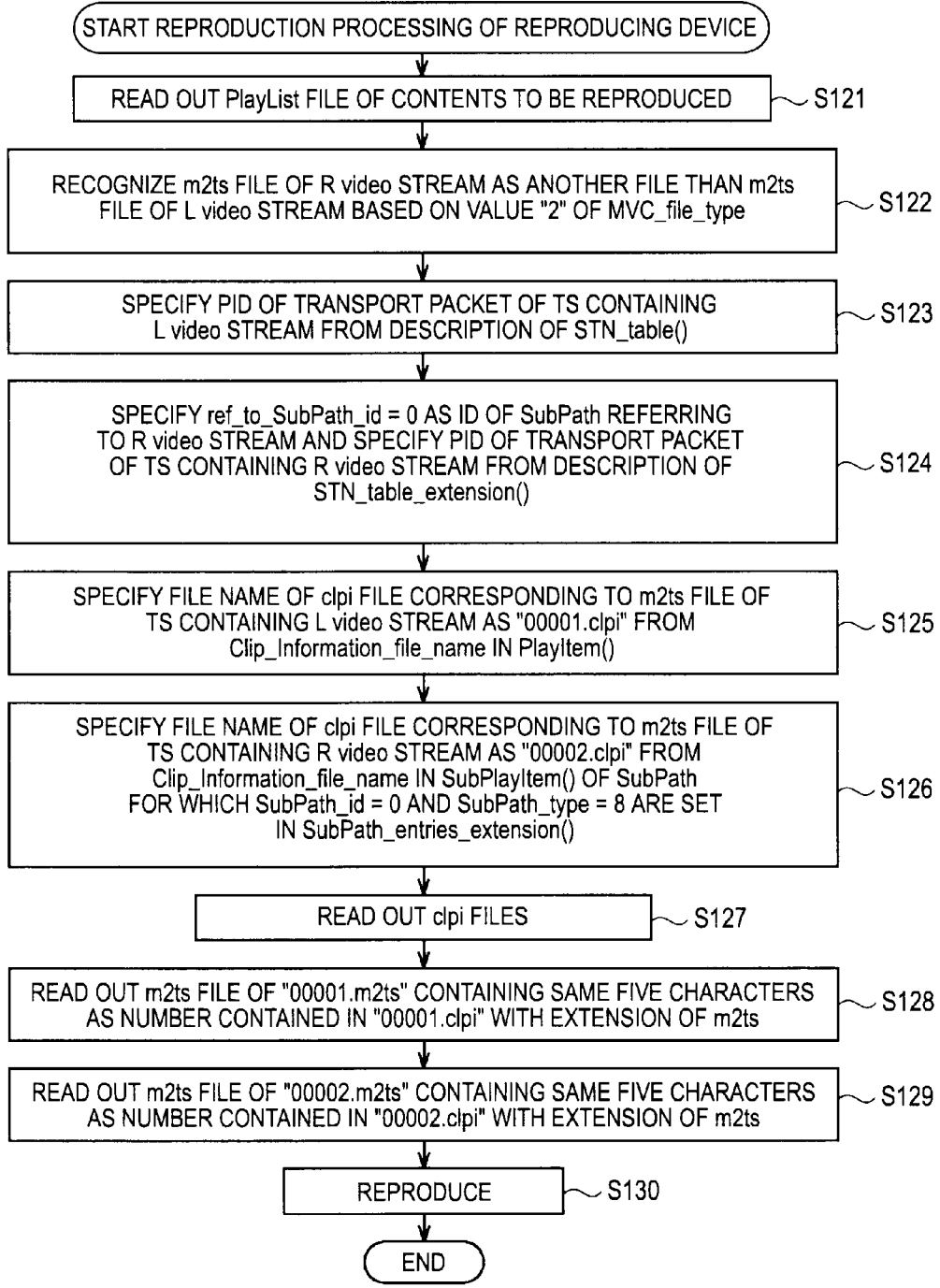
FIG. 45 is a flowchart for explanation of processing of the reproducing device of reproducing the 3D contents copied by the processing in FIG. 44.

Processing of the reproducing device 1 of reproducing the 3D contents copied in the local storage 34 by the processing in FIG. 44 will be explained with reference to FIG. 45.

At step S121, the reproduction control part 74 reads out the PlayList file #1 (the PlayList file #1 in FIG. 42) of the 3D contents to be reproduced from the local storage 34.

At step S122, the reproduction control part 74 recognizes that the mt2s file of the R video stream is another file than the mt2s file of the L video stream based on the value "2" of the MVC_file_type of the PlayList file #1.

At step S123, the reproduction control part 74 specifies the PID of the transport packet of the TS containing the L video stream from the description of the STN_table( ). This processing corresponds to the processing at step S1 in FIG. 26, for example.

At step S124, the reproduction control part 74 specifies the ref_to_SubPath_id=0 as the ID of the SubPath referring to the R video stream from the description of the STN_table_extension( ), and specifies the PID of the transport packet of the TS containing the R video stream. This processing corresponds to the processing at step S2 in FIG. 26, for example.

At step S125, the reproduction control part 74 specifies the file name of the clpi file corresponding to the m2ts file of the Main TS containing the L video stream as "00001.clpi" from the Clip_Information_file_name in the PlayItem( ). This processing corresponds to the processing at step S3 in FIG. 26, for example.

At step S126, the reproduction control part 74 specifies the SubPath for which SubPath_id=0 is set and SubPath_type=8 is set in the SubPath_entries_extension( ). Further, the reproduction control part 74 specifies the file name of the clpi file corresponding to the m2ts file containing the R video stream as "00002.clpi" from the Clip_Information_file_name in the SubPlayItem( ) of the specified SubPath. This processing corresponds to the processing at step S4 in FIG. 26, for example.

At step S127, the reproduction control part 74 reads out the Clip Information files #11 and #12 from the local storage 34 based on the specified file names. From the Clip Information files #11 and #12, the chunk_map( ) has been deleted as shown in FIG. 43.

At step S128, the reproduction control part 74 reads out the m2ts file of "00001.m2ts" containing the same five characters as the number contained in "00001.clpi" with extension of m2ts, i.e., the L video stream from the local storage 34.

At step S129, the reproduction control part 74 reads out the m2ts file of "00002.m2ts" containing the same five characters as the number contained in "00002.clpi" with extension of m2ts, i.e., the R video stream from the local storage 34.

At step S130, the reproduction control part 74 outputs the streams read out from the local storage 34 to the decode unit 36 for reproduction. The reproduction of the streams read out from the local storage 34 is performed in the same manner as the above described processing.

That is, the data of the L video stream supplied to the decode unit 36 is output to the read buffer 52 via the separation part 51 in FIG. 22 and the data of the R video stream is output to the read buffer 55.

The transport packet of the L video stream stored in the read buffer 52 is extracted by the PID filter 53 based on the PID specified at step S123, and supplied to the decoder 60 via the ES buffer 54 and the switch 59. The transport packet of the R video stream stored in the read buffer 55 is extracted by the PID filter 56 based on the PID specified at step S124, and supplied to the decoder 60 via the switch 57, the ES buffer 58, and the switch 59.

In the decoder 60, the packets sequentially supplied from the switch 59 are decoded and reproduction of the L video streams and the R video streams is performed.

The reproduction of the 3D contents copied from the optical disc 2 in the local storage 34 is performed in the above described manner.

Embodiment 2

In the above description, whether or not the mt2s file of the L video stream and the mt2s file of the R video stream are interleaved and recorded in the optical disc 2 has been determined based on the value of the MVC_file_type, however, that may be determined based on other information.

Figure 46:
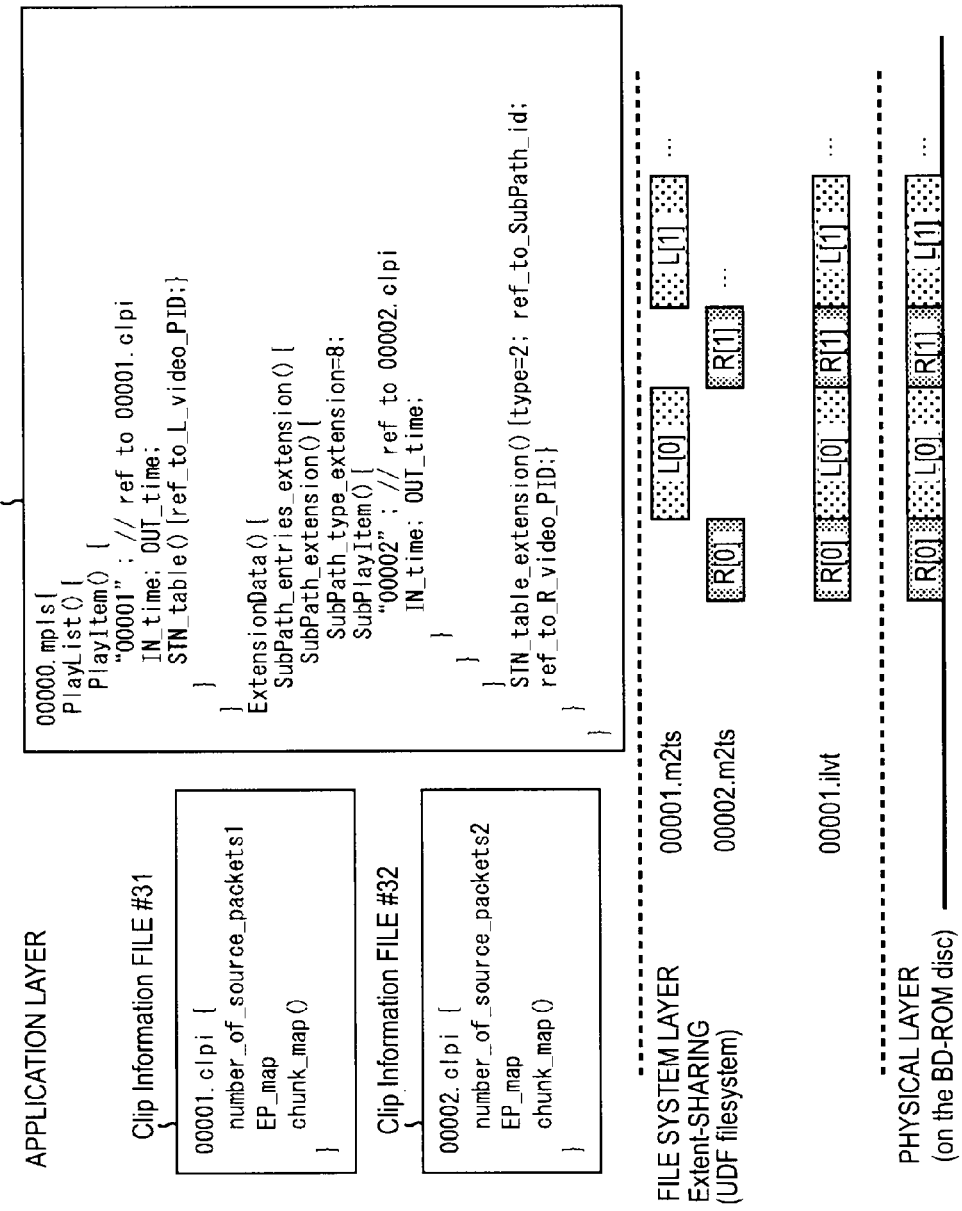
FIG. 46 is another diagram showing the concept of file management of 3D contents to be copied.

FIG. 46 is another diagram showing the concept of file management of 3D contents to be copied.

In a PlayList file #21 in FIG. 46, whether or not the mt2s file of the L video stream and the mt2s file of the R video stream are interleaved and recorded in the optical disc 2 is shown by the SubPath_type_extension contained in the ExtensionData( ). As shown in FIG. 46, the PlayList file #21 contains no MVC_file_type. Further, the file contains no MVC_flag.

The PlayList file #21 in FIG. 46 is the same as the PlayList file #1 in FIG. 38 except that no MVC_file_type or MVC_flag is contained.

In this case, meanings of the values of the SubPath_type_extension are as shown in FIG. 47.

As shown in FIG. 47, the meanings of the values of the SubPath_type_extension are basically the same as the meanings of the respective values that have been explained with reference to FIG. 17, and the meaning shown by an underline is added as the meaning of SubPath_type_extension=8.

That is, SubPath_type_extension=8 in the PlayList file #21 with no MVC_file_type shows that the SubPath for which SubPath_type_extension=8 is set is SubPath referring to the R video stream. Further, it shows that the m2ts file of the R video stream referred to is another file than the m2ts file of the L video stream referred to by the PlayItem. Furthermore, it shows that the m2ts file of the R video stream and the m2ts file of the R video stream are interleaved and recorded in the optical disc 2.

The reproducing device 1 may determine whether or not the mt2s file of the L video stream and the mt2s file of the R video stream are interleaved and recorded in the optical disc 2 from the value of the SubPath_type_extension.

Further, the meanings of the values of the normal SubPath_type contained in the subPath( ) field (from the 34th line to the 40th line in FIG. 11) are as shown in FIG. 48.

As shown in FIG. 48, the meanings of the values of the SubPath_type are basically the same as the meanings of the respective values that have been explained with reference to FIG. 14, and the meaning shown by an underline is added as the meaning of SubPath_type=5.

That is, SubPath_type=5 in the PlayList file #21 with no MVC_file_type shows that the SubPath for which SubPath_type=5 is set is SubPath referring to the R video stream. Further, it shows that the m2ts file of the L video stream referred to by the PlayItem is another file than the m2ts file of the R video stream and the m2ts file of the R video stream is supplied from the local storage.

The meanings of the values of SubPath_type=0 to 7 are also used as meanings of the values of SubPath_type_extension=0 to 7.

Returning to the explanation of FIG. 46, Clip Information files #31 and #32 in FIG. 46 are the same as the Clip Information files #11 and #12 in FIG. 38. Further, the contents of the file system layer and the physical layer shown in FIG. 46 are the same as the contents shown in FIG. 38.

Example 1 of Copy Processing

Here, processing of the reproducing device 1 of copying the 3D contents in FIG. 46 recorded in the optical disc 2 in the local storage 34 will be explained with reference to a flowchart in FIG. 49.

At step S141, the data acquisition part 71 reads out the PlayList file #21 as the PlayList file of the 3D contents to be copied from the optical disc 2. The PlayList file #21 is acquired by the data acquisition part 71 and supplied to the information processing part 72.

At step S142, the information processing part 72 recognizes reference to the ilvt file based on the value "8" of the SubPath_type_extension of the PlayList file #21.

At step S143, the information processing part 72 specifies the file name of the clpi file corresponding to the m2ts file of the Main TS containing the L video stream as "00001.clpi" from the Clip_Information_file_name in the PlayItem( ).

At step S144, the information processing part 72 specifies the SubPath for which SubPath_id=0 is set and SubPath_type=8 is set in the SubPath_entries_extension( ). Further, the information processing part 72 specifies the file name of the clpi file corresponding to the m2ts file containing the R video stream as "00002.clpi" from the Clip_Information_file_name in the SubPlayItem( ) of the specified SubPath.

At step S145, the data acquisition part 71 reads out the Clip Information files #31 and #32 from the optical disc 2 based on the file names specified by the information processing part 72.

At step S146, the information processing part 72 specifies "00001.ilvt" containing the same five characters as the number (00001) contained in the file forming the Clip of the L video with extension of ilvt.

At step S147, the information processing part 72 controls the data acquisition part 71 to designate "00001.m2ts" containing the same five characters as the number contained in "00001.clpi" with extension of m2ts as a readout file and read out it from the optical disc 2. The recording control part 73 copies the m2ts file of "00001.m2ts" read out by the data acquisition part 71, i.e., the L video stream in the local storage 34.

At step S148, the information processing part 72 controls the data acquisition part 71 to designate "00002.m2ts" containing the same five characters as the number contained in "00002.clpi" with extension of m2ts as a readout file and read out it from the optical disc 2. The recording control part 73 copies the m2ts file of "00002.m2ts" read out by the data acquisition part 71, i.e., the R video stream in the local storage 34.

At step S149, the information processing part 72 deletes the chunk_map( ) from the clpi file of "00001.clpi" read out at step S145 and outputs it to the recording control part 73 as a new Clip Information file #31. The recording control part 73 copies the new Clip Information file #31 supplied from the information processing part 72 in the local storage 34.

At step S150, the information processing part 72 deletes the chunk_map( ) from the clpi file of "00002.clpi" read out at step S145 and outputs it as a new Clip Information file #32 to the recording control part 73. The recording control part 73 copies the new Clip Information file #32 supplied from the information processing part 72 in the local storage 34.

At step S151, the information processing part 72 changes the value of the SubPath_type_extension contained in the field of the ExtensionData( ) of the PlayList file #21 from "8" to "5", and outputs it as a new PlayList file #21 to the recording control part 73. The recording control part 73 copies the new PlayList file #21 supplied from the information processing part 72 in the local storage 34.

FIG. 50 shows the PlayList file #21 in which the value of SubPath_type_extension( ) has been changed.

As shown by an underline, the value of the SubPath_type_extension is changed from "8" to "5" by the information processing part 72. The PlayList file #21 containing the description in FIG. 50 is recorded together with the m2ts file that manages the L video stream and the m2ts file that manages the R video stream in the local storage 34, and used as reproduction control information for the copied 3D contents.

FIG. 51 shows Clip Information files #31 and #32 from which chunk_map( ) has been deleted. The Clip Information files #31 and #32 shown in FIG. 51 are the same as the Clip Information files #11 and #12 shown in FIG. 43, respectively.

Figure 49:
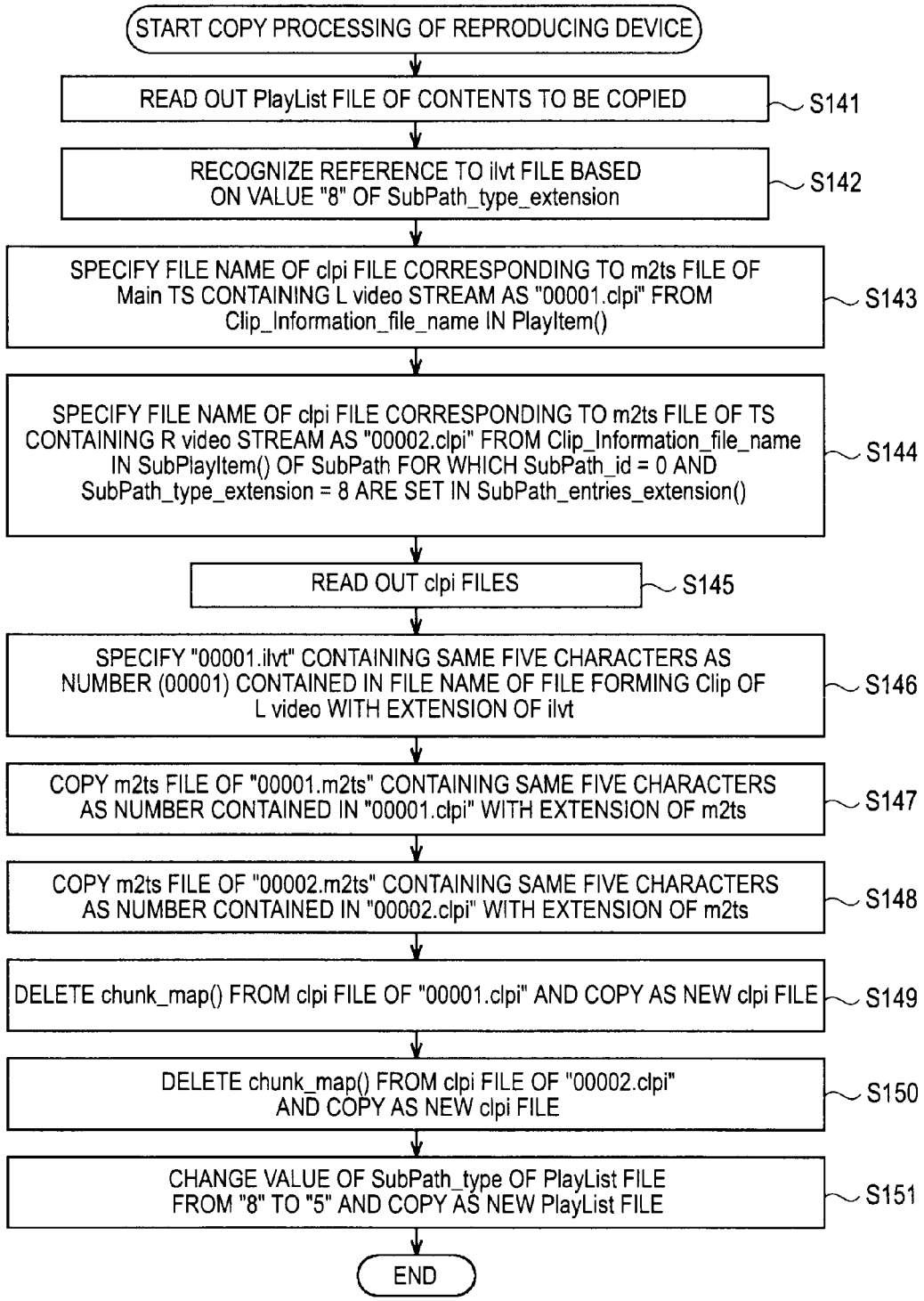
FIG. 49 is a flowchart for explanation of processing of the reproducing device of copying the 3D contents in FIG. 46.

The state of the local storage 34 after copying is performed by the processing in FIG. 49 is the same as the status shown in FIG. 44.

That is, in the local storage 34, the L video stream managed by "00001.m2ts" and the R video stream managed by "00002.m2ts" are recorded. Further, the clpi file of "00001.clpi" (Clip Information file #31) is recorded in correspondence with the m2ts file of "00001.m2ts" and the clpi file of "00002.clpi" (Clip Information file #32) is recorded in correspondence with the m2ts file of "00002.m2ts".

Thereby, whether or not the mt2s file of the L video stream and the mt2s file of the R video stream are interleaved and recorded in the optical disc 2 may be determined based on the SubPath_type_extension( ) and copying may efficiently be performed.

Example 1 of Reproduction Processing of Copied 3D contents

Processing of the reproducing device 1 of reproducing the 3D contents copied by the processing in FIG. 49 in the local storage 34 will be explained with reference to a flowchart in FIG. 52.

At step S161, the reproduction control part 74 reads out the PlayList file #21 (the PlayList file #21 in FIG. 50) of the 3D contents to be reproduced from the local storage 34.

At step S162, the reproduction control part 74 recognizes that the m2ts file of the R video stream is another file than the m2ts file of the L video stream based on the value "5" of the SubPath_type_extension of the PlayList file #21.

At step S163, the reproduction control part 74 specifies the PID of the transport packet of the TS containing the L video stream from the description of the STN_table( ).

At step S164, the reproduction control part 74 specifies the ref_to_SubPath_id=0 as the ID of the SubPath referring to the R video stream, and specifies the PID of the transport packet of the TS containing the R video stream from the description of the STN_table_extension( ).

At step S165, the reproduction control part 74 specifies the file name of the clpi file corresponding to the m2ts file of the TS containing the L video stream as "00001.clpi" from the Clip_Information_file_name in the PlayItem( ).

At step S166, the reproduction control part 74 specifies the SubPath for which SubPath_id=0 is set and SubPath_type=8 is set in the SubPath_entries_extension( ). Further, the part specifies the file name of the clpi file corresponding to the m2ts file of the TS containing the R video stream as "00002.clpi" from the Clip_Information_file_name in the SubPlayItem( ) of the specified SubPath.

At step S167, the reproduction control part 74 reads out the Clip Information files #31 and #32 from the local storage 34 based on the specified file names. From the Clip Information files #31 and #32, the chunk_map( ) has been deleted as shown in FIG. 51.

At step S168, the reproduction control part 74 reads out the m2ts file of "00001.m2ts" containing the same five characters as the number contained in "00001.clpi" with extension of m2ts, i.e., the L video stream from the local storage 34.

At step S169, the reproduction control part 74 reads out the m2ts file of "00002.m2ts" containing the same five characters as the number contained in "00002.clpi" with extension of m2ts, i.e., the R video stream from the local storage 34.

At step S170, the reproduction control part 74 outputs the streams read out from the local storage 34 to the decode unit 36 for reproduction. The reproduction of the streams read out from the local storage 34 is performed in the same manner as the processing at step S131 in FIG. 45.

Example 2 of Copy Processing

As the change made to the PlayList file #21 at copying, the change of the value of the SubPath_type_extension( ) has been made in the processing in FIG. 49, however, a change of shifting the description of the SubPath_extension( ) from the field of ExtensionData( ) to the field of SubPath( ) may be made.

As the description on the SubPath referring to the R video stream, the STN_table_extension( ) of the SubPath_entries_extension( ) and the STN_table_extension( ) contained in the field of the ExtensionData( ) is described in the field of ExtensionData( ) without change.

In the explanation with reference to FIG. 11, information of the SubPath_extension( ) in the SubPath_entries_extension( ) on the 47th line (FIG. 16) is shifted as information within the SubPath( ) from the 34th line to the 40th line. The PlayList file #21 in which contents have been changed in this manner is recorded as a new PlayList file #21 in the local storage 34.

Other processing of the reproducing device 1 of copying 3D contents in FIG. 46 recorded in the optical disc 2 in the local storage 34 will be explained with reference to a flow-chart in FIG. 53.

Figure 53:
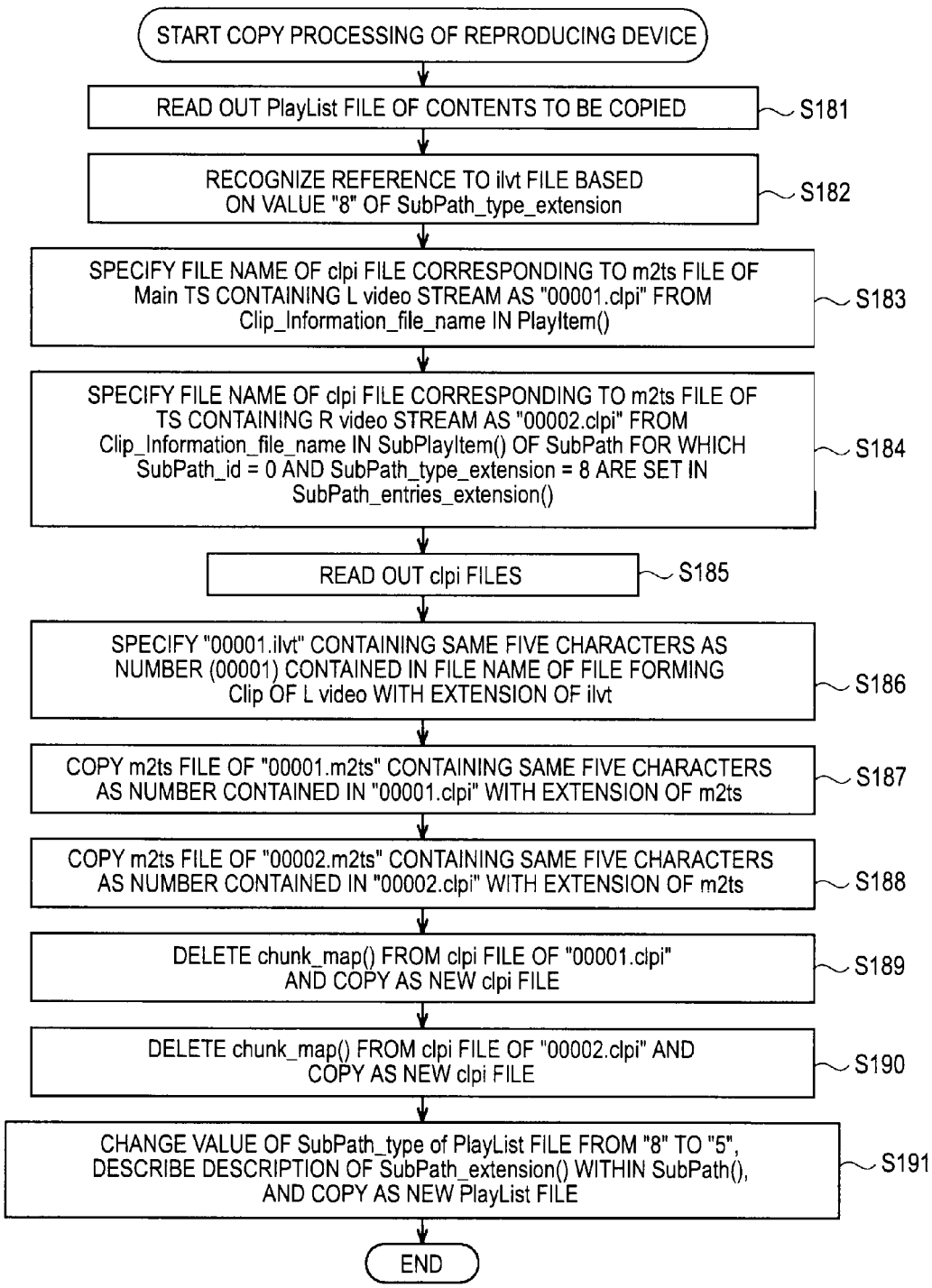
FIG. 53 is a flowchart for explanation of another processing of the reproducing device of copying the 3D contents in FIG. 46.

In the processing in FIG. 53, the PlayList file #21 in which the information within the SubPath_extension( ) is rewritten as information within the SubPath( ) is copied. The processing in FIG. 53 is the same processing as the processing that has been explained with reference to FIG. 49 except that the contents rewritten in the PlayList file #21 are different.

At step S181, the data acquisition part 71 reads out the PlayList file #21 as the PlayList file of the 3D contents to be copied from the optical disc 2.

At step S182, the information processing part 72 recognizes reference to the ilvt file based on the value "8" of the SubPath_type_extension in the PlayList file #21.

At step S183, the information processing part 72 specifies the file name of the clpi file corresponding to the m2ts file of the Main TS containing the L video stream as "00001.clpi" from the Clip_Information_file_name in the PlayItem( ) of the PlayList file #21.

At step S184, the information processing part 72 specifies the SubPath for which SubPath_id=0 is set and SubPath_type=8 is set in the SubPath_entries_extension( ). Further, the information processing part 72 specifies the file name of the clpi file corresponding to the m2ts file containing the R video stream as "00002.clpi" from the Clip_Information_file_name in the SubPlayItem( ) of the specified SubPath.

At step S185, the data acquisition part 71 reads out the Clip Information files #31, #32 from the optical disc 2.

At step S186, the information processing part 72 specifies "00001.ilvt" containing the same five characters as the number (00001) contained in the file name of the files forming the Clip of the L video with extension of ilvt.

At step S187, the information processing part 72 controls the data acquisition part 71 to designate "00001.m2ts" containing the same five characters as the number contained in "00001.clpi" with extension of m2ts as a readout file and read out it from the optical disc 2. The recording control part 73 copies the m2ts file of "00001.m2ts" read out from the data acquisition part 71, i.e., the L video stream in the local storage 34.

At step S188, the information processing part 72 controls the data acquisition part 71 to designate "00002.m2ts" containing the same five characters as the number contained in "00002.clpi" with extension of m2ts as a readout file and read out it from the optical disc 2. The recording control part 73 copies the m2ts file of "00002.m2ts" read out from the data acquisition part 71, i.e., the R video stream in the local storage 34.

At step S189, the information processing part 72 deletes the chunk_map( ) from the clpi file of "00001.clpi" read out at step S185 and outputs it as a new Clip Information file #31 to the recording control part 73. The recording control part 73 copies the new Clip Information file #31 supplied from the information processing part 72 in the local storage 34.

At step S190, the information processing part 72 deletes the chunk_map( ) from the clpi file of "00002.clpi" read out at step S185 and outputs it as a new Clip Information file #32 to the recording control part 73. The recording control part 73 copies the new Clip Information file #32 supplied from the information processing part 72 in the local storage 34.

At step S191, the information processing part 72 changes the value of the SubPath_type_extension of the PlayList file #21 from "8" to "5". Further, the information processing part 72 describes the description of the SubPath_extension( ) within the ExtensionData( ) and outputs it as a new PlayList file #21 to the recording control part 73. The recording control part copies the new PlayList file #21 supplied from the information processing part 72 in the local storage 34.

FIG. 54 shows the PlayList file #21 in which the location of the description of SubPath_extension( ) has been changed.

As shown by an underline, the value of the SubPath_type is set to "5" by the information processing part 72. Further, the description of the SubPlayItem( ) described in the SubPath_extension( ) is described within the SubPath( ). The SubPlayItem( ) within the SubPath( ) contains the file name of the clpi file corresponding to the R video stream referred to by the SubPlayItem, the SubPlayItem_IN_time indicating the start location of the reproduction section, and the SubPlayItem_OUT_time indicating the end location.

The PlayList file #21 containing the description in FIG. 54 is recorded in the local storage 34 together with the mt2s file that manages the L video stream and the mt2s file that manages the R video stream, and used as reproduction control information for the copied 3D contents.

The Clip Information files #31 and #32 copied in the local storage 34 are the same as the Clip Information files #11 and #12 shown in FIG. 51.

Example 2 of Reproduction Processing of Copied 3D Contents

Figure 55:
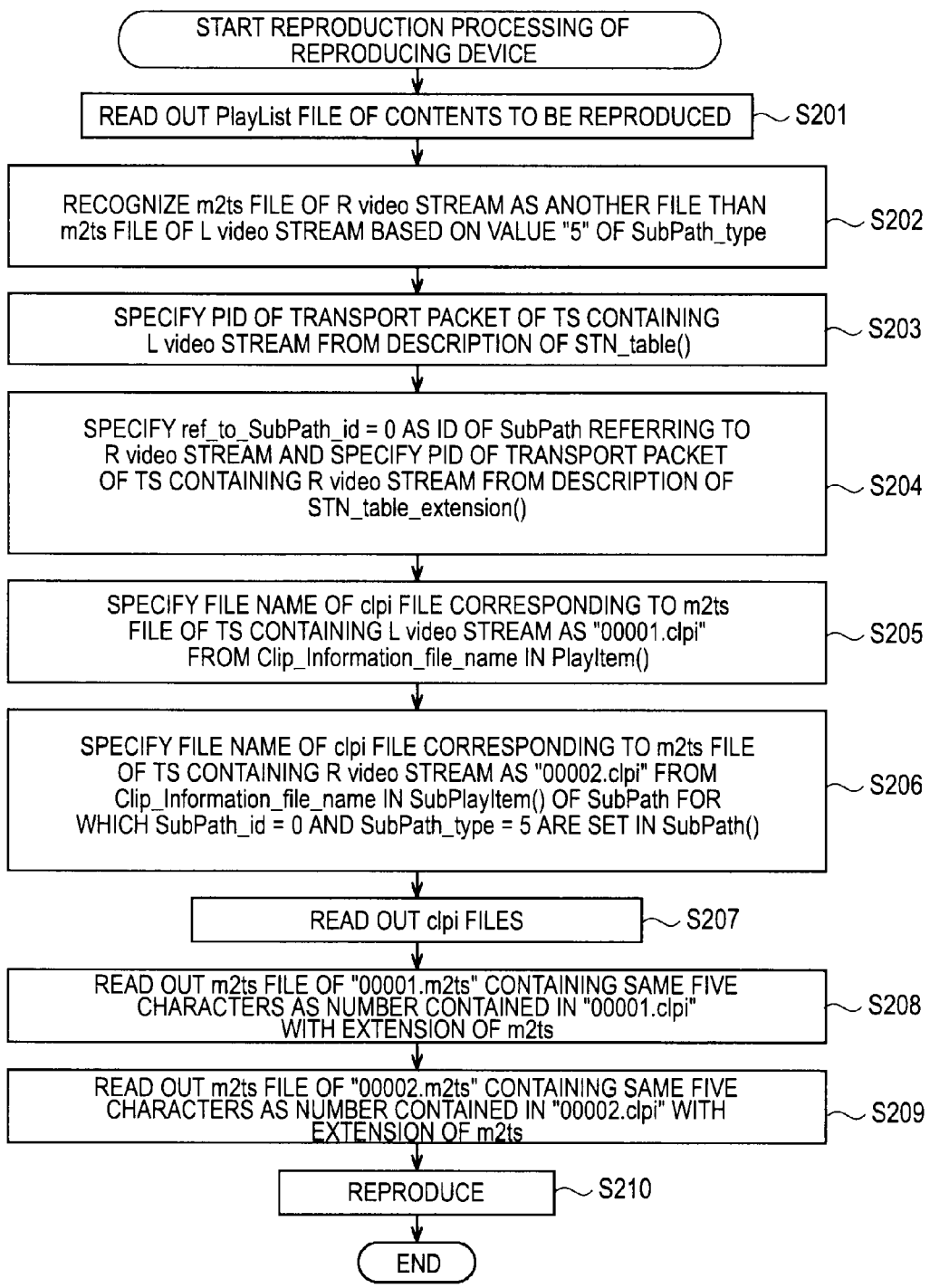
FIG. 55 is a flowchart for explanation of processing of the reproducing device of reproducing the 3D contents copied by the processing in FIG. 53.

Processing of the reproducing device 1 of copying 3D contents copied by the processing in FIG. 53 in the local storage 34 will be explained with reference to a flowchart in FIG. 55.

At step S201, the reproduction control part 74 reads out the PlayList file #21 (the PlayList file #21 in FIG. 54) to be reproduced from the local storage 34.

At step S202, the reproduction control part 74 recognizes that the m2ts file of the R video stream is another file than the m2ts file of the L video stream based on the value "5" of the SubPath_type of the PlayList file #21.

As has been explained with reference to FIG. 48, the value "5" of the SubPath_type shows that the m2ts file of the R video stream referred to by the PlayItem is another file than the m2ts file of the L video stream, and the m2ts file of the R video stream is supplied from the local storage.

Figure 52:
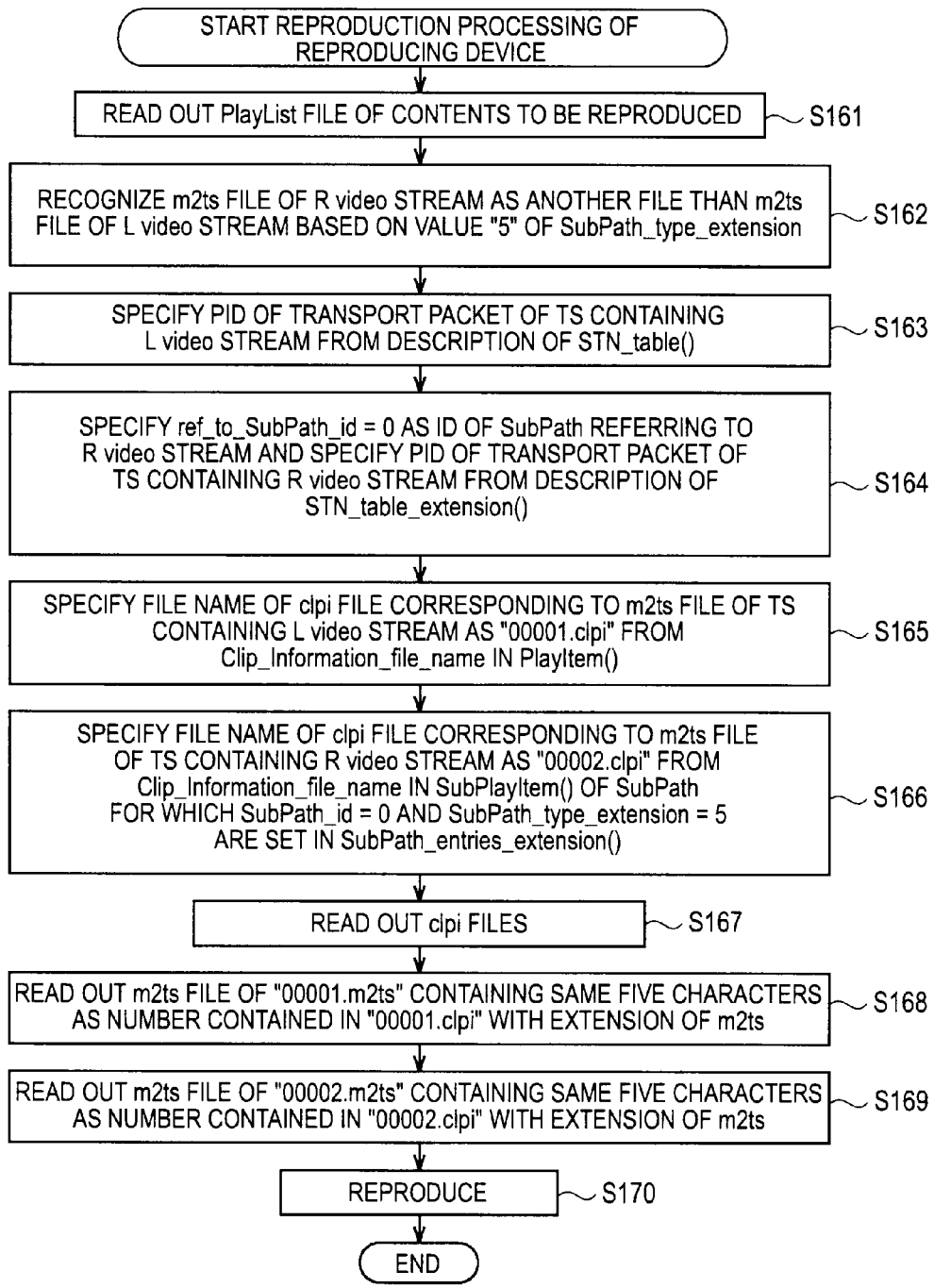
FIG. 52 is a flowchart for explanation of processing of the reproducing device of reproducing the 3D contents copied by the processing in FIG. 49.

The processing from steps S203 to S210 is the same processing as the processing from steps S163 to S170 in FIG. 52. At step S203, the reproduction control part 74 specifies the PID of the transport packet of the TS containing the R video stream from the description of the STN_table( ).

At step S204, the reproduction control part 74 specifies the ref_to_SubPath_id=0 as the ID of the SubPath referring to the R video stream, and specifies the PID of the transport packet of the TS containing the R video stream from the description of the STN_table extension( ).

At step S205, the reproduction control part 74 specifies the file name of the clpi file corresponding to the m2ts file of the TS containing the L video stream as "00001.clpi" from the Clip_Information_file_name in the PlayItem( ).

At step S206, the reproduction control part 74 specifies the SubPath for which SubPath_id=0 is set and SubPath_type=5 is set in the SubPath( ). Further, the reproduction control part 74 specifies the file name of the clpi file corresponding to the m2ts file containing the R video stream as "00002.clpi" from the Clip_Information_file_name in the SubPlayItem( ) of the specified SubPath.

At step S207, the reproduction control part 74 reads out the Clip Information files #31 and #32 from the local storage 34 based on the specified filenames. From the Clip Information files #31 and #32, the chunk_map( ) has been deleted.

At step S208, the reproduction control part 74 reads out the m2ts file of "00001.m2ts" containing the same five characters as the number contained in "00001.clpi" with extension of m2ts, i.e., the L video stream from the local storage 34.

At step S209, the reproduction control part 74 reads out the m2ts file of "00002.m2ts" containing the same five characters as the number contained in "00002.clpi" with extension of m2ts, i.e., the R video stream from the local storage 34.

At step S210, the reproduction control part 74 outputs the streams read out from the local storage 34 to the decode unit 36 for reproduction.

Configuration Example of Computer

The above described series of processing may be executed using hardware or software. When the series of processing is executed using software, a program forming the software is installed from a program recording medium into a computer incorporated into dedicated hardware or a general-purpose computer.

FIG. 56 is a block diagram showing a configuration example of hardware of a computer that executes the above described series of processing.

A CPU (Central Processing Unit) 151, a ROM (Read Only Memory) 152, a RAM (Random Access Memory) 153 are interconnected via a bus 154.

An input/output interface 155 is further connected to the bus 154. To the input/output interface 155, an input unit 156 of a keyboard, a mouse, etc., and an output unit 157 of a display, a speaker, etc. are connected. Further, to the input/output interface 155, a storage unit 158 of a hard disk, a nonvolatile memory, etc., a communication unit 159 of a network interface etc., a drive 160 that drives removable media 161 are connected.

In the computer having the above described configuration, for example, the CPU 151 loads the program stored in the storage unit 158 into the RAM 153 via the input/output interface 155 and the bus 154 and execute it, and thereby, the above described series of processing is performed.

For example, the program to be executed by the CPU 151 is recorded and provided in the removable media 161 or provided via a wired or wireless transmission medium such as a local area network, the Internet, or digital broadcasting, and installed into the storage unit 158.

Note that the program to be executed by the computer may be a program of performing processing in time sequence in the order in which the processing has been explained in the specification, or a program of performing processing in parallel or at necessary times when a call is issued or the like.

The embodiments of the present disclosure are not limited to the above described embodiments and various changes may be made without departing the scope of the present disclosure.

The present disclosure contains subject matter related to that disclosed in Japanese Priority Patent Application JP 2010-142864 filed in the Japan Patent Office on Jun. 23, 2010, the entire contents of which is hereby incorporated by reference.

What is claimed is:

1. An information processing device comprising:
a processor configured to:
determine whether or not a basic stream that can be reproduced singly and an extended stream used for reproduction with the basic stream forming a video stream of contents to be copied are interleaved with respect to each data in a predetermined unit and recorded in a first recording medium, based on control information as information for controlling reproduction of the contents recorded in the first recording medium, and change a value of recording status information representing whether or not the basic stream and the extended stream are interleaved with respect to each data in the predetermined unit and recorded contained in the control information to a value representing that the streams are not interleaved but recorded; and a recording controller, in the case of a determination that the basic stream and the extended stream are interleaved with respect to each data in the predetermined unit and recorded, configured to:

designate a first file among the first file that manages the basic stream, a second file that manages the extended stream, and a third file that manages the basic stream and the extended stream, copy the basic stream from the first recording medium to a second recording medium, designate the second file and copy the extended stream from the first recording medium to the second recording medium, and record the control information containing the recording status information in which the value has been changed in the second recording medium.

2. The information processing device according to claim 1, wherein the first recording medium is a Blu-ray Disc, and the control information is a playlist on Blu-ray standards.

3. The information processing device according to claim 2, wherein the recording status information is contained in information on a main path referring to the basic stream forming the playlist.

4. The information processing device according to claim 2, wherein the recording status information is a sub path type as information representing a type of a sub path referring to the extended stream contained as information of an extended field in the playlist.

5. The information processing device according to claim 4, wherein the processor is configured to change the control information so that the information on the sub path contained as the information of the extended field in the playlist may be contained as information of a field for sub path different from the extended field, and the recording controller is configured to allow recording of the control information in which the field containing the information on the sub path has been changed in the second recording medium.

6. The information processing device according to claim 2, wherein the processor is configured to delete information on respective locations of collections of source packets on the first recording medium as data in the predetermined unit forming the basic stream from first clip information referred to at reproduction of the basic stream and recorded in correspondence with the basic stream in the first recording medium, and delete information on respective locations of collections of source packets on the first recording medium as data in the predetermined unit forming the extended stream from second clip information referred to at reproduction of the extended stream and recorded in correspondence with the extended stream in the first recording medium, and the recording controller is configured to allow recording of the first clip information and the second clip information from which the information on the respective locations of the collections of source packets on the first recording medium have been deleted in the second recording medium.

7. The information processing device according to claim 2, wherein the second recording medium includes a local storage of the information processing device.

8. The information processing device according to claim 1, wherein copying of the basic stream from the first recording medium to the second recording medium includes copying the entire base stream to the second recording medium, and copying of the extended stream from the first recording medium to the second recording medium includes copying of the entire extended stream to the second recording medium.

9. The information processing device according to claim 8, wherein the entire base stream is stored separate from the entire extended stream on the second recording medium.

10. The information processing device according to claim 9, wherein the second recording medium is usable to reproduce the base stream, or the base stream and the extended stream, separate from the first recording medium.

11. The information processing device according the claim 8 wherein the base stream and the extended stream are not interleaved on the second recording medium.

12. The information processing device according to claim 11, wherein the second recording medium is usable to reproduce the base stream, or the base stream and the extended stream, separate from the first recording medium.

13. The information processing device according to claim 8, wherein the second recording medium is usable to reproduce the base stream, or the base stream and the extended stream, separate from the first recording medium.

14. The information processing device according to claim 1, wherein the second recording medium is usable to reproduce the base stream, or the base stream and the extended stream, separate from the first recording medium.

15. The information processing device according to claim 1, wherein the base stream and the extended stream are not interleaved on the second recording medium.

16. The information processing device according to claim 1, further comprising a reproduction device reproducing the base stream, or the base stream and the extended stream, from the second recording medium.

17. The information processing device according to claim 16, wherein the reproduction device reproduces the base stream, or the base stream and the extended stream, from the second recording medium without use of the first recording medium.

18. The information processing device according to claim 1, wherein the first file, the second file, and the third file are stream files relating to a stream directory in an optical disc management structure.

19. An information processing method comprising:

determining whether or not a basic stream that can be reproduced singly and an extended stream used for reproduction with the basic stream forming a video stream of contents to be copied are interleaved with respect to each data in a predetermined unit and recorded in a first recording medium, based on control information as information for controlling reproduction of the contents recorded in the first recording medium; and in the case of a determination that the basic stream and the extended stream are interleaved with respect to each data in the predetermined unit and recorded, designating a first file among the first file that manages the basic stream, a second file that manages the extended stream, and a third file that manages the basic stream and the extended stream, copying of the basic stream from the first recording medium to a second recording medium, designating the second file and copying of the extended stream from the first recording medium to the second recording medium, changing a value of recording status information representing whether or not the basic stream and the extended stream are interleaved with respect to each data in the predetermined unit and recorded contained in the control information to a value representing that the streams are not interleaved but recorded, and recording the control information containing the recording status information in which the value has been changed in the second recording medium.

20. A non-transitory computer readable medium storing a program causing a computer to execute processing comprising:

determining whether or not a basic stream that can be reproduced singly and an extended stream used for reproduction with the basic stream forming a video stream of contents to be copied are interleaved with respect to each data in a predetermined unit and recorded in a first recording medium, based on control information as information for controlling reproduction of the contents recorded in the first recording medium; and in the case of a determination that the basic stream and the extended stream are interleaved with respect to each data in the predetermined unit and recorded, designating a first file among the first file that manages the basic stream, a second file that manages the extended stream, and a third file that manages the basic stream and the extended stream, copying of the basic stream from the first recording medium to a second recording medium, designating the second file and copying of the extended stream from the first recording medium to the second recording medium, changing a value of recording status information representing whether or not the basic stream and the extended stream are interleaved with respect to each data in the predetermined unit and recorded contained in the control information to a value representing that the streams are not interleaved but recorded, and recording the control information containing the recording status information in which the value has been changed in the second recording medium.

* * * * *